(12) United States Patent
Kuniyasu et al.

(10) Patent No.: US 10,480,751 B2
(45) Date of Patent: Nov. 19, 2019

(54) WAVELENGTH CONVERSION LAMINATED FILM

(71) Applicant: FUJIFILM Corporation, Tokyo (JP)

(72) Inventors: Satoshi Kuniyasu, Kanagawa (JP); Tatsuya Oba, Kanagawa (JP); Masayuki Kusumoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/956,240

(22) Filed: Apr. 18, 2018

(65) Prior Publication Data

US 2018/0238519 A1 Aug. 23, 2018

Related U.S. Application Data

(63) Continuation of application No. PCT/JP2016/004627, filed on Oct. 19, 2016.

(30) Foreign Application Priority Data

Oct. 20, 2015 (JP) .................................. 2015-206183

(51) Int. Cl.
*F21V 9/08* (2018.01)
*F21V 9/40* (2018.01)
(Continued)

(52) U.S. Cl.
CPC .................. *F21V 9/08* (2013.01); *F21K 9/64* (2016.08); *F21V 9/30* (2018.02); *F21V 9/40* (2018.02);
(Continued)

(58) Field of Classification Search
CPC ..... F21V 9/08; F21V 9/64; F21V 9/30; F21V 9/40; G02B 5/20; G02F 1/133602; G02F 1/133615
See application file for complete search history.

(56) References Cited

U.S. PATENT DOCUMENTS 9,817,270 B2* 11/2017 Nagatani ................. G02B 6/005
2007/0063155 A1* 3/2007 Fukui .................. C09K 11/7733
250/484.4

(Continued)

FOREIGN PATENT DOCUMENTS

JP  2009-283441 A  12/2009
JP  2010-061098 A  3/2010
(Continued)

OTHER PUBLICATIONS

International Search Report issued in PCT/JP2016/004627 dated Feb. 14, 2017.
(Continued)

*Primary Examiner* — Bryon T Gyllstrom
(74) *Attorney, Agent, or Firm* — Edwards Neils LLC; Jean C. Edwards, Esq.

(57) ABSTRACT

The wavelength conversion laminated film includes a laminate which has a wavelength conversion layer containing a phosphor and a gas barrier layer laminated on both the main surfaces of the wavelength conversion layer and an end face sealing layer which covers at least end faces of the wavelength conversion layer among end faces of the laminate, in which the end face sealing layer includes, from the side of the end faces of the laminate, a first metal layer coming into contact with the end faces, a resin layer, and a second metal layer in this order.

11 Claims, 5 Drawing Sheets

(51) Int. Cl.
*F21V 9/30* (2018.01)
*G02B 5/20* (2006.01)
*F21K 9/64* (2016.01)
*G02F 1/1335* (2006.01)

(52) U.S. Cl.
CPC ......... *G02B 5/20* (2013.01); *G02F 1/133602* (2013.01); *G02F 1/133615* (2013.01); *G02F 2001/133614* (2013.01)

(56) References Cited

U.S. PATENT DOCUMENTS

| | | | |
|---|---|---|---|
| 2010/0051898 A1 | 3/2010 | Kim et al. | |
| 2011/0002140 A1* | 1/2011 | Tsukahara | G02B 5/0236 362/602 |
| 2011/0037926 A1* | 2/2011 | Tsukahara | G02B 6/0023 349/64 |
| 2011/0240960 A1 | 10/2011 | Kim et al. | |
| 2012/0039066 A1* | 2/2012 | Hatanaka | C25D 11/06 362/84 |
| 2012/0113672 A1 | 5/2012 | Dubrow et al. | |
| 2012/0236587 A1* | 9/2012 | Kim | B23K 26/0604 362/602 |
| 2013/0334557 A1 | 12/2013 | Uchida et al. | |
| 2014/0097461 A1* | 4/2014 | Ito | C09K 11/02 257/98 |
| 2014/0230992 A1 | 8/2014 | Kim et al. | |
| 2014/0319995 A1* | 10/2014 | Kim | G02F 1/133512 313/501 |
| 2015/0192273 A1* | 7/2015 | Hikmet | B82Y 30/00 362/84 |
| 2015/0300600 A1 | 10/2015 | Dubrow et al. | |
| 2016/0137918 A1* | 5/2016 | Hori | C09K 11/7731 428/1.1 |
| 2016/0349428 A1 | 12/2016 | Dubrow et al. | |
| 2016/0363713 A1 | 12/2016 | Dubrow et al. | |

FOREIGN PATENT DOCUMENTS

| | | |
|---|---|---|
| JP | 2013-068728 A | 4/2013 |
| JP | 2013-544018 A | 12/2013 |
| JP | 2014-024917 A | 2/2014 |
| JP | 2014-199831 A | 10/2014 |
| JP | 2015-000967 A | 1/2015 |
| WO | 2012102107 A1 | 8/2012 |

OTHER PUBLICATIONS

Written Opinion issued in PCT/JP2016/004627 dated Feb. 14, 2017.
International Preliminary Report on Patentability completed by WIPO dated Apr. 24, 2018, in connection with International Patent Application No. PCT/JP2016/004627.

* cited by examiner

WAVELENGTH CONVERSION LAMINATED FILM

CROSS-REFERENCE TO RELATED APPLICATIONS

This application is a continuation application of International Application No. PCT/JP2016/004627 filed Oct. 19, 2016, which was published under PCT Article 21(2) in Japanese, and which claims priority under 35 U.S.C. § 119(a) to Japanese Patent Application No. 2015-206183, filed Oct. 20, 2015. The above applications are hereby expressly incorporated by reference, in their entirety, into the present application.

BACKGROUND OF THE INVENTION

1. Field of the Invention

The present invention relates to a wavelength conversion laminated film used in a backlight or the like of a liquid crystal display.

2. Description of the Related Art

As an image display device that consumes less power and occupies a small space, a liquid crystal display (hereinafter, referred to as LCD as well) is increasingly widely used year after year. Furthermore, in recent years, for the liquid crystal display, a further reduction in power consumption, the enhancement of color reproducibility, and the like have been required.

As the reduction in power consumption is required for LCD, in order to increase light use efficiency and enhance color reproducibility in a backlight (backlight unit), the use of a wavelength conversion layer is suggested which includes, as a light emitting material (phosphor), a quantum dot (referred to as QD as well) emitting light by converting the wavelength of incidence rays.

The quantum dot is in an electronic state of which the movement is restricted in all directions in a three-dimensional space. In a case where a semiconductor nanoparticle is three-dimensionally surrounded by a high-potential barrier, the nanoparticle becomes a quantum dot. The quantum dot exhibits various quantum effects. For example, the quantum dot exhibits "quantum size effect" in which the state density (energy level) of an electron becomes discrete. According to the quantum size effect, by changing the size of the quantum dot, the absorption wavelength or emission wavelength of light can be controlled.

Generally, quantum dots are dispersed in a matrix formed of a resin such as an acrylic resin or an epoxy resin. The quantum dot layer in which the quantum dots are contained in the matrix is used, for example, as a quantum dot film performing wavelength conversion by being disposed between an excitation light source and a liquid crystal panel.

In a case where excitation light from the excitation light source is incident on the quantum dot film, the quantum dots are excited and emit fluorescence. At this time, in a case where quantum dots having different emission characteristics are used, light having a narrow half-width such as red light, green light, and blue light are emitted, and hence white light can be realized. Because the fluorescence from the quantum dots has a narrow half-width, by appropriately selecting the wavelength, it is possible to obtain white light with high luminance or to prepare a design so as to obtain excellent color reproducibility.

Incidentally, unfortunately, the quantum dots easily deteriorate due to oxygen or the like, and the emission intensity of the quantum dots deteriorates due to a photo-oxidation reaction. Therefore, as a quantum dot film, a laminated film is used in which a gas barrier film is laminated on both the main surfaces of a quantum dot layer so as to protect the quantum dot layer.

However, in a case where both surfaces of the quantum dot layer are simply sandwiched between gas barrier films, unfortunately, oxygen or moisture permeates the quantum dot layer from the end face not being covered with the gas barrier film, and hence the quantum dots deteriorate.

Accordingly, a method is suggested in which in addition to both surfaces of a quantum dot layer, the periphery of the quantum dot layer is also sealed with a gas barrier film or the like.

For example, WO2012/102107A describes a composition obtained by dispersing quantum dot phosphors in a cycloolefin (co)polymer at a concentration within a range of 0.0% to 20% by mass, and describes a constitution having a gas barrier layer that coats the entire surface of a resin-molded material in which quantum dots are dispersed. WO2012/102107A also describes that the gas barrier layer is constituted with a resin layer and a silica film or an alumina film which is formed on at least one surface of the resin layer.

JP2013-544018A describes a display backlight unit including a remote phosphor film containing an emission quantum dot (QD) aggregate, and describes a constitution in which a QD phosphor material is sandwiched between two gas barrier films, and an inert region having gas barrier properties is located in a region sandwiched between the two gas barrier films at the periphery around the QD phosphor material.

JP2009-283441A describes a light emitting device including a color conversion layer that converts at least a portion of colored light emitted from a light source portion into another colored light and an impermeable sealing sheet that seals the color conversion layer, and describes a constitution including a second adhesive layer provided in the form of a frame along the outer periphery of a phosphor layer (color conversion layer), that is, surrounding the planar shape of the phosphor layer, in which the second adhesive layer is formed of an adhesive material having gas barrier properties.

Furthermore, JP2010-61098A describes a quantum dot wavelength converter having a quantum dot layer (wavelength converting portion) and sealing members formed of silicone or the like that seals the quantum dot layer, and describes a constitution in which the quantum dot layer is sandwiched between the sealing members, and the sealing members are bonded to each other on the periphery of the quantum dot layer.

SUMMARY OF THE INVENTION

Incidentally, the quantum dot layer used for LCD is a thin film having a thickness of about 5 µm to 350 µm. In WO2012/102107A, such a thin film is not considered as a resin-molded material in which quantum dot phosphors are dispersed. Coating the entire surface of such a thin film with a gas barrier layer by using the technique described in WO2012/102107A is extremely difficult, and doing such a thing has a problem of poor productivity.

In a case where a constitution is adopted in which a protective layer having gas barrier properties is formed in an end face region of a quantum dot layer sandwiched between two gas barrier films as described in JP2013-544018A and JP2009-283441A, a so-called dam filling-type laminated film is prepared by forming a protective layer at the peripheral portion of one gas barrier film, then forming a resin layer in the region surrounded by the protective layer, and then laminating the other gas barrier film on the protective layer and the resin layer. According to the aforementioned preparation method, the width of the protective layer increases, that is, a frame portion is enlarged. As a result, unfortunately, the region in which the quantum dot layer is formed is narrowed, and the region which can be effectively used as a light emitting region is reduced.

In the constitution described in JP2010-61098A in which the opening on the edge of two gas barrier films sandwiching the quantum dot layer therebetween is narrowed and the quantum dot layer is sealed, the thickness of the quantum dot layer on the edge becomes smaller than the thickness of the central portion of the quantum dot layer. Accordingly, the luminous efficiency on the edge decreases. That is, as in the cases described in JP2013-544018A and JP2009-283441A, in this constitution, unfortunately, the region which can be effectively used as a light emitting region is narrowed and cannot be used as a light emitting region, and the frame portion is enlarged. Generally, a barrier layer having high gas barrier properties is hard and brittle. In a case where the edge region of a gas barrier film having such a barrier layer is suddenly curved so as to seal the edge, unfortunately, the barrier layer cracks, and the gas barrier properties deteriorate.

The present invention has been made in consideration of the circumstances described above, and an object thereof is to provide a wavelength conversion laminated film including a quantum dot layer or the like having a phosphor deteriorating due to oxygen, in which the phosphor can be prevented from deteriorating due to oxygen or the like permeating from an end face.

A wavelength conversion laminated film of the present invention comprises a laminate which has a wavelength conversion layer containing a phosphor and a gas barrier layer laminated on both the main surfaces of the wavelength conversion layer and an end face sealing layer which covers at least end faces of the wavelength conversion layer among end faces of the laminate, in which the end face sealing layer includes, from the side of the end faces of the laminate, a first metal layer coming into contact with end faces of the laminate, a resin layer, and a second metal layer in this order.

Herein, "gas barrier layer" refers to a layer having an oxygen permeability of equal to or lower than 10 cc/(m$^2$·day·atm). The gas barrier layer may be a single layer or may have a laminated structure of a plurality of layers including a support.

In the wavelength conversion laminated film of the present invention, it is preferable that the second metal layer is formed to cover an outer surface of the resin layer.

In the wavelength conversion laminated film of the present invention, it is preferable that the resin layer is covered with the first metal layer and the second metal layer.

In the wavelength conversion laminated film of the present invention, it is preferable that the end face sealing layer covers the end faces of the laminate.

In the wavelength conversion laminated film of the present invention, it is preferable that a thickness of the first metal layer is 0.01 μm to 1 μm, and the first metal layer is a layer formed by vapor-phase deposition.

In the wavelength conversion laminated film of the present invention, it is preferable that an oxygen permeability of the resin layer is equal to or lower than 50 cc/(m$^2$·day·atm).

In the wavelength conversion laminated film of the present invention, it is preferable that the resin layer contains metal nanoparticles, and the second metal layer is an electroless plating layer.

In the wavelength conversion laminated film of the present invention, it is preferable that the phosphor is quantum dot.

In the present specification, "covering~face" means covering the entirety of~face. For example, covering an end face means covering the entirety of the end face.

The wavelength conversion laminated film of the present invention includes a wavelength conversion layer containing a phosphor, a gas barrier layer laminated on both the main surfaces of the wavelength conversion layer, and an end face sealing layer covering at least end faces of the wavelength conversion layer, in which the end face sealing layer includes a first metal layer coming into contact with end faces of the laminate, a resin layer, and a second metal layer in this order. According to this constitution, by the gas barrier layer and the end face sealing layer, the permeation of oxygen into the wavelength conversion layer can be effectively inhibited. Because the permeation of oxygen into the wavelength conversion layer is inhibited, it is possible to inhibit the deterioration of emission characteristics of the phosphor in the wavelength conversion layer.

DESCRIPTION OF THE PREFERRED EMBODIMENTS

Hereinafter, the wavelength conversion laminated film of the present invention will be specifically described with reference to drawings.

The following components will be described based on typical embodiments of the present invention in some cases, but the present invention is not limited to the embodiments.

In the present specification, a range of numerical values described using "to" means a range including the numerical values listed before and after "to" as a lower limit and an upper limit respectively.

[Wavelength Conversion Laminated Film]

Figure 1:
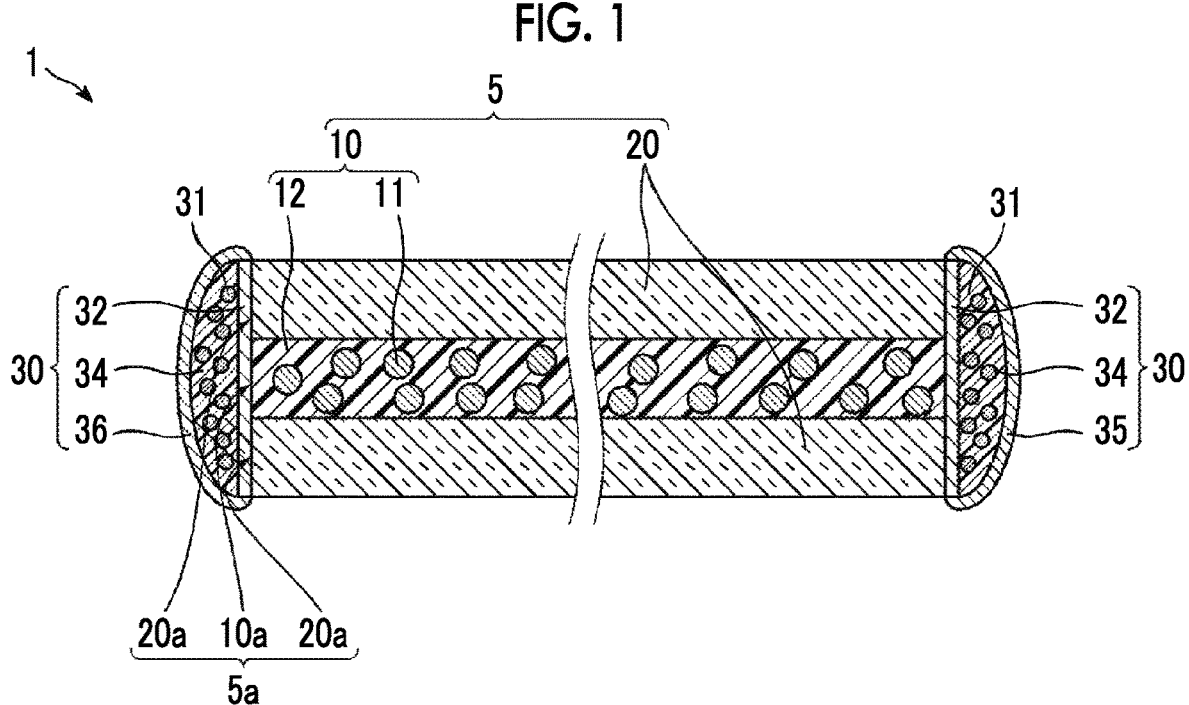
FIG. 1 is a cross-sectional view schematically showing the constitution of an example of a wavelength conversion laminated film of the present invention.
Figure 2:
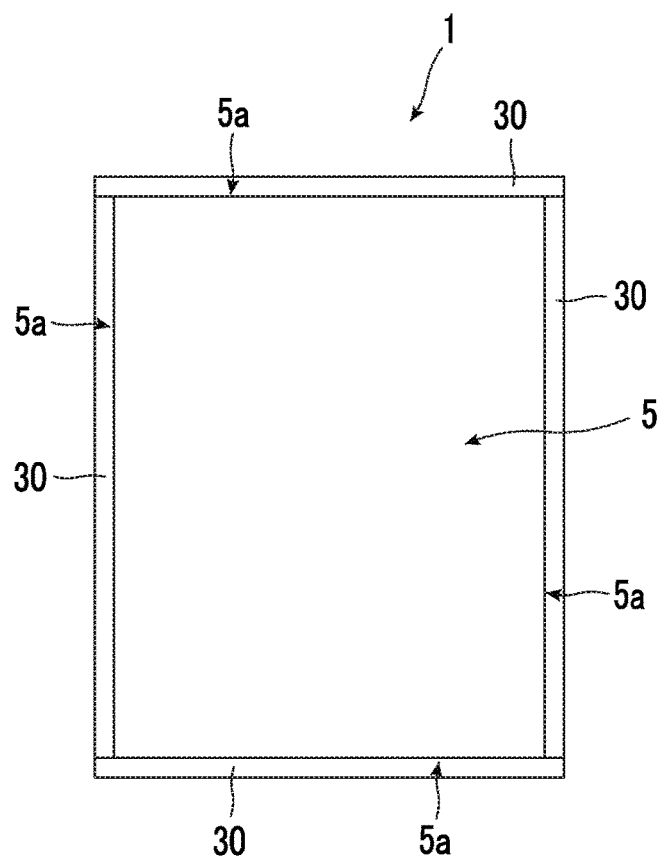
FIG. 2 is a plan view schematically showing the constitution of an example of the wavelength conversion laminated film of the present invention.

FIGS. 1 and 2 are a cross-sectional view and a plan view respectively that schematically show the constitution of an example of the wavelength conversion laminated film of the present invention.

A wavelength conversion laminated film (hereinafter, referred to as a laminated film) 1 shown in FIG. 1 includes a laminate 5, which is obtained by laminating a wavelength conversion layer 10 containing phosphors 11 and a gas barrier layer 20 on both surfaces (both the main surfaces) of the wavelength conversion layer 10, and an end face sealing layer 30 which covers end faces 5a of the laminate 5. In the end face sealing layer 30, a first metal layer 32, a resin layer 34, and a second metal layer 36 are formed in this order from the end face 5a side of the laminate 5. The end faces 5a of the laminate 5 include end faces 10a of the wavelength conversion layer 10 and end faces 20a of two sheets of gas barrier layers 20.

The gas barrier layer 20 is a layer having an oxygen permeability of equal to or lower than 10 cc/(m$^2$·day·atm). By the gas barrier layers 20, both the main surfaces of the wavelength conversion layer 10 are protected such that the oxygen permeation is prevented.

As shown in FIG. 2, the laminated film 1 has a quadrangular main surface and includes the end face sealing layer 30 covering all of four end faces 5a of the laminate 5. Because the laminated film 1 has such an end face sealing layer 30, oxygen or the like is inhibited from permeating from the end faces 10a of the wavelength conversion layer 10 that are not covered with the gas barrier layer 20.

Because the oxygen permeation into the wavelength conversion layer 10 is inhibited by the gas barrier layer 20 and the end face sealing layer 30 as described above, it is possible to inhibit the deterioration of the light emitting function of the phosphors 11 in the wavelength conversion layer 10.

Figure 3:
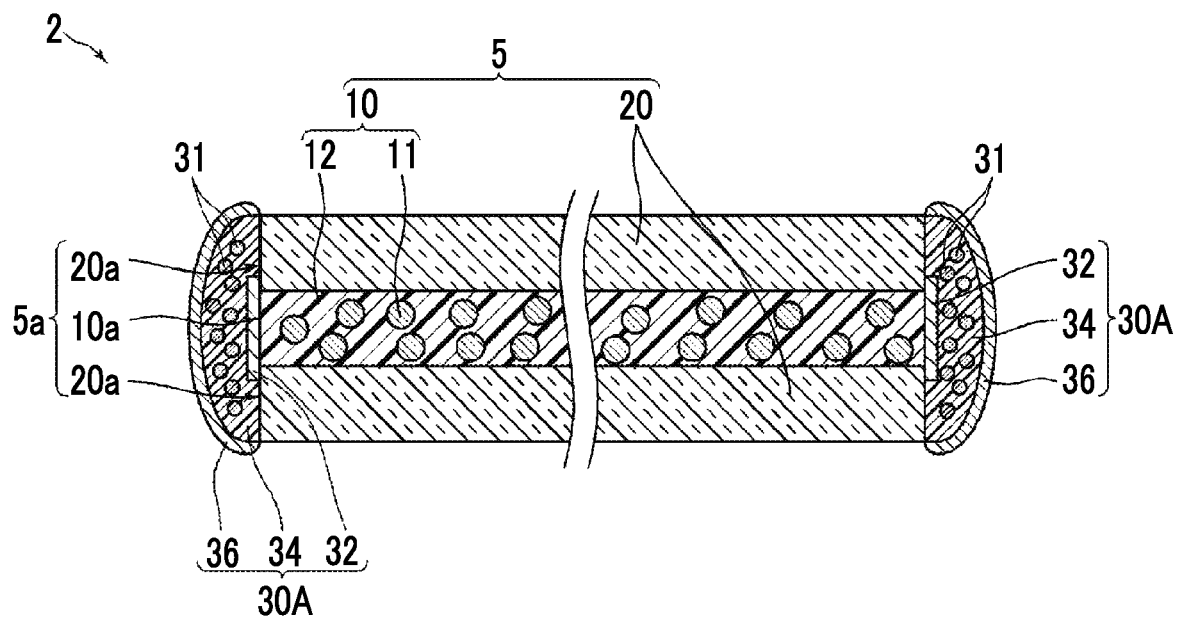
FIG. 3 is a cross-sectional view schematically showing an example of a gas barrier layer used in the wavelength conversion laminated film of the present invention.
Figure 4:
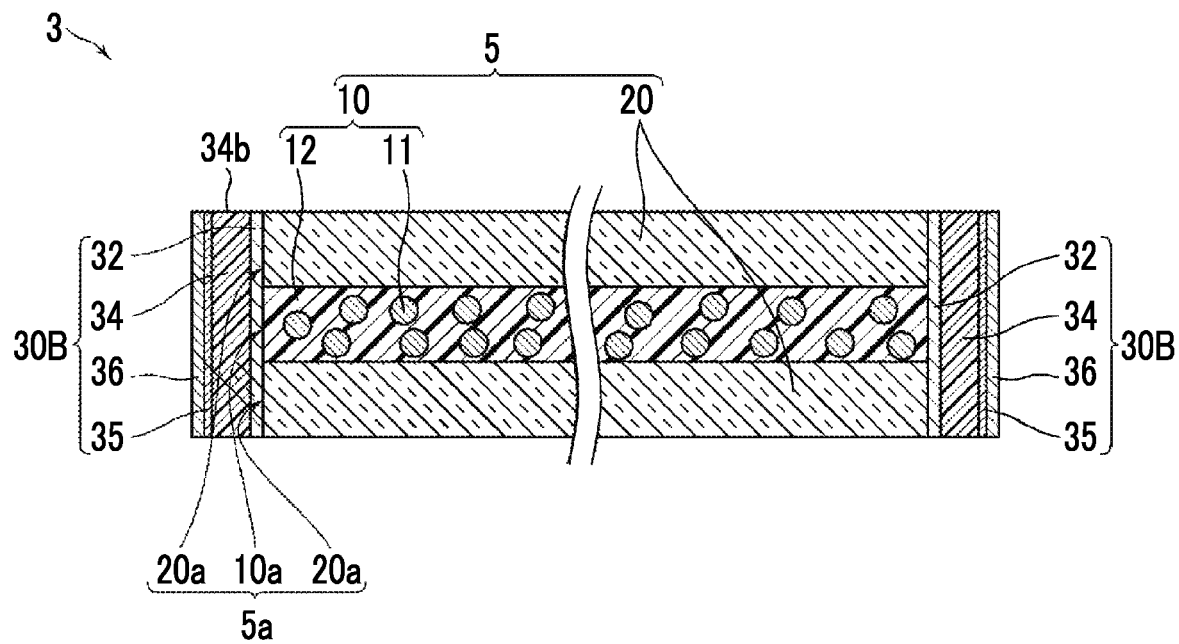
FIG. 4 is a cross-sectional view schematically showing the constitution of another example of the wavelength conversion laminated film of the present invention.

FIGS. 3 and 4 are cross-sectional views schematically showing another example and still another example of the wavelength conversion laminated film of the present invention. The wavelength conversion laminated films shown in FIGS. 3 and 4 are different from the laminated film 1 shown in FIG. 1 in terms of the constitution of the end face sealing layer.

In the laminated film 1 shown in FIG. 1, the end face sealing layer 30 is formed to cover the entirety of the end faces 5a of the laminate 5. However, in the present invention, the end face sealing layer only needs to be formed to cover at least the end faces 10a of the wavelength conversion layer 10 among the end faces 5a of the laminate 5, similarly to an end face sealing layer 30A of a laminated film 2 shown in FIG. 3. In the end face sealing layer 30A shown in FIG. 3, the first metal layer 32 covers the end faces 10a of the wavelength conversion layer 10 but does not cover end faces 20a of the gas barrier layer 20. Even though this constitution is adopted, it is possible to effectively inhibit the oxygen permeation into the wavelength conversion layer 10.

As in the laminated films 1 and 2 shown in FIGS. 1 and 3, it is preferable that the second metal layer 36 is formed to cover an outer surface of the resin layer 34 (surface other than the surface on the end face 5a side of the laminate). However, as in an end face sealing layer 30B of a laminated film 3 shown in FIG. 4, the second metal layer 36 does not need to be formed on the entirety of the outer surface of the resin layer 34. In the example shown in FIG. 4, within the end face sealing layer 30B, end faces 34b of the resin layer 34 that are flush with the main surface of the laminated film 3 are a portion of the outer surface of the resin layer 34 but are exposed without being covered with the second metal layer 36. From the viewpoint of more effectively preventing the oxygen permeation, it is preferable that the outer surface of the resin layer 34 is covered with the second metal layer 36 as shown in FIGS. 1 and 3. Particularly, it is preferable to adopt the constitution in which the resin layer 34 is covered with the first metal layer 32 and the second metal layer 36 as shown in FIG. 1, that is, the constitution in which the resin layer 34 is enclosed with the first metal layer 32 and the second metal layer 36, because then the oxygen permeation preventing effect becomes strongest.

Hereinafter, the end face sealing layers 30, 30A, and 30B will be more specifically described. In the following section, in a case where the end face sealing layers do not need to be particularly differentiated from each other, the end face sealing layers 30, 30A, and 30B will be simply described as an end face sealing layer 30.

<End Face Sealing Layer>

As described above, the end face sealing layer 30 is obtained by forming the first metal layer 32, the resin layer 34, and the second metal layer 36 in this order from the end face 5a side of the laminate 5.

Because the laminated film 1 has the end face sealing layer 30 formed as above, oxygen or the like is prevented from permeating the wavelength conversion layer 10 from the end faces 10a not being covered with the gas barrier layer 20 and prevented from deteriorating the members such as quantum dots performing optical functions.

As described above, in the related art, as a constitution preventing oxygen or moisture from permeating a wavelength conversion layer such as a quantum dot layer, a constitution in which the entire surface of the wavelength conversion layer is covered with a gas barrier film, a dam filling method in which both surfaces of the wavelength conversion layer are sandwiched between gas barrier films and the end face region thereof is sealed with a resin layer, a constitution in which the openings on the edges of two gas barrier films between which the wavelength conversion layer is sandwiched are narrowed and sealed, and the like have been examined.

However, these constitutions have problems in that sufficient gas barrier properties cannot be secured, the frame portion is enlarged, and the productivity is poor.

In order to solve the problems, regarding a laminated film formed by sandwiching a wavelength conversion layer such as a quantum dot layer between gas barrier layers, the inventors of the present invention examined, as a constitution which inhibits the permeation of oxygen or moisture from end faces of the wavelength conversion layer and can enlarge a region in which the quantum dot layer can be effectively used by reducing the frame portion, a constitution in which a sealing layer having gas barrier properties is provided on end faces of a laminate such that the end faces are sealed.

The inventors examined a method in which an inorganic film having high gas barrier properties is formed as the aforementioned sealing layer directly on the end faces of the laminate by means of vapor-phase deposition. As a result, the inventors have found that in a case where the inorganic film is formed directly on the end faces of the laminate, sometimes a defect such as a pinhole occurs, and hence sufficient gas barrier properties are not obtained.

Therefore, in the present invention, as an end face sealing layer sealing the end faces of a laminate, a constitution is adopted which includes a first metal layer disposed to come into contact with the end faces of the laminate, a resin layer, and a second metal layer in this order from the side of the end faces of the laminate. In the end face sealing layer of the wavelength conversion laminated film of the present invention, a defect such as a pinhole occurring in the first metal layer formed directly on the end faces of the laminate is buried in the resin layer, and the second metal layer is provided on a surface of the resin layer having smooth surfaces. Because the second metal layer is formed on the resin layer more flat than the end faces of the laminate, a defect such as a pinhole hardly occurs at the time of forming the film. Accordingly, the gas barrier properties resulting from the second metal layer are extremely high, and it is possible to effectively prevent the deterioration of the wavelength conversion layer caused by oxygen or moisture.

In the laminated film 1 shown in FIGS. 1 and 2, as a preferable aspect, all of four end faces 5a of the laminate 5 including the wavelength conversion layer 10 and the gas barrier layer 20 are sealed with the end face sealing layer 30, but the present invention is not limited to this aspect.

That is, for example, in a case where the laminated film 1 of the present invention has a quadrangular planar shape, among four end faces, only two end faces facing each other may be provided with the end face sealing layer or three end faces except for one end face may be provided with the end face sealing layer. Furthermore, the end face sealing layer may be provided such that it covers only the end face 10a of the wavelength conversion layer in each of the end faces 5a of the laminate 5. Where to provide the end face sealing layer may be appropriately set according to the constitution of a backlight unit in which the laminated film is used, the constitution of a laminated film-mounting portion, and the like.

Nonetheless, the end face sealing layer 30 is preferably formed in as large area as possible on the end faces 5a of the laminate 5 and particularly preferably provided on all of the end faces 5a of the laminate 5 as in the laminated film 1 shown in FIG. 1, because then the deterioration of the wavelength conversion layer 10 such as the deterioration of quantum dots caused by the oxygen or the like permeating from the end faces of the laminate 5 can be more suitably prevented.

In the example shown in FIG. 1, the end face sealing layer 30 has a constitution in which the second metal layer 36 is directly provided on the surface of the resin layer 34. However, similarly to the end face sealing layer 30B shown in FIG. 4, the end face sealing layer may further include an underlayer 35 for forming the second metal layer 36 on the surface of the resin layer 34.

The end face sealing layer may further have other layers. For example, the end face sealing layer may have, on the second metal layer 36, a resin layer which is for protecting the second metal layer 36 or for further improving the gas barrier properties. The oxygen permeability of such a resin layer is preferably equal to or lower than 50 cc/($m^2$·day·atm).

Furthermore, the end face sealing layer may have three or more metal layers. For example, the end face sealing layer may have a resin layer on the second metal layer 36 and a third metal layer on the resin layer. In this way, the larger the number of metal layers and resin layers alternately laminated is, the further the oxygen permeation inhibiting effect can be improved.

By forming the end face sealing layer 30 as a laminated structure of the first metal layer 32, the resin layer 34, and the second metal layer 36, the oxygen permeability of the end face sealing layer 30 can be made equal to or lower than $1 \times 10^{-2}$ [cc/($m^2$·day·atm)].

By forming the end face sealing layer 30 which has low oxygen permeability, that is, high gas barrier properties on the end faces 5a of the laminate 5, it is possible to more suitably prevent the permeation of oxygen or moisture into the wavelength conversion layer 10 and to more suitably prevent the deterioration of the wavelength conversion layer 10.

In some cases, it is preferable that the end face sealing layer 30 is formed only on the end faces 5a of the laminate 5 and hardly wraps the main surface of the laminate 5 for the following reasons. In a case where the end face sealing layer 30 wraps a large area of the main surface of the laminate 5, the end face sealing layer 30 will be heaped up on the main surface, and hence the overall flatness of laminated film 1 will be impaired. Furthermore, the portion wrapped with the end face sealing layer 30 will function as a light blocking layer, and as a result, a non-light-emitting region may occur on the edge of the laminated film 1, the frame portion may be enlarged, and the effectively usable area may be reduced.

From the viewpoints described above, the amount of the main surface of the laminate 5 that is wrapped with the end face sealing layer 30 is preferably equal to or smaller than 1 mm, more preferably equal to or smaller than 0.5 mm, and particularly preferably equal to or smaller than 0.1 mm which makes it difficult for the presence of a wrapped portion to be noticed. The wrapping amount of the end face sealing layer 30 can be measured by, for example, cross-section cutting performed on the laminated film by using RETORATOME REM-710 manufactured by YAMATO KOHKI INDUSTRIAL CO., LTD and observing the cross-section with an optical microscope.

The first metal layer 32 can be constituted, for example, with any of titanium (Ti), copper (Cu), aluminum (Al), silver (Ag), gold (Au), and platinum (Pt) or with an alloy composed of two or more kinds of these metals. It is preferable that the first metal layer 32 is formed by a vapor-phase method such as a sputtering method or a vapor deposition method. Particularly, it is preferable that the first metal layer 32 is formed by a sputtering method. That is, the first metal layer 32 is preferably a layer formed by vapor-phase deposition and particularly preferably a sputtering film. The thickness of the first metal layer is preferably 0.01 µm to 1 µm. The first metal layer may be a single layer or may be constituted with a plurality of layers formed of different metals.

As described above, in the first metal layer 32 directly formed on the end faces 5a of the laminate 5, due to the insufficient flatness of the end faces 5a or the like, a pinhole occurs in many cases. Accordingly, in a case where only the first metal layer 32 is used, oxygen or the like permeates the wavelength conversion layer from the pinhole, and as a result, sometimes the deterioration of the emission characteristics cannot be sufficiently inhibited. The pinhole means an uncoated portion (a portion where the metal layer 32 is missed) having a size equal to or greater than 1 µm that is seen in a case where the metal layer is observed with an optical microscope. The pinhole has any shape such as a circular shape, a polygonal shape, or a linear shape.

The resin layer 34 is formed on the surface of the first metal layer 32. In the end face sealing layers 30 and 30A of the laminated films shown in FIGS. 1 and 3, metal nanoparticles 31, which will be described later, are dispersed in the resin layer 34.

As described above, in a case where the laminated film has the resin layer 34, the pinhole in the first metal layer 32 can be buried in the resin, and the permeation of oxygen or the like from the pinhole can be inhibited. Furthermore, the surface on which the second metal layer 36 will be formed can be smoothed. Accordingly, it is possible to prevent a defect such as a pinhole from occurring in the second metal layer 36 and to reliably express the gas barrier properties by the metal layer 36.

The thickness of the resin layer 34 is preferably 1 µm to 100 µm, and more preferably 5 µm to 50 µm.

Through examinations, the inventors of the present invention have found that in a case where the thickness of the resin layer 34 is equal to or greater than 1 µm, at the time of forming the second metal layer 36, it is possible to smoothen the underlayer and to inhibit the occurrence of a defect such as a pinhole.

Furthermore, the inventors have found that in a case where the thickness of the resin layer 34 is equal to or smaller than 100 µm, at the time of forming the resin layer 34, it is possible to form the resin layer 34 without the deterioration of the adhesiveness between the resin layer 34 and the first metal layer 32 that results from the cure shrinkage of the material which will become the resin layer 34.

In the example constitution shown in FIG. 4, in which a portion of the resin layer 34 is exposed to the outside air, or in the constitution shown in FIG. 3, in which the resin layer 34 comes into direct contact with a support portion, which will be described later, of the gas barrier layer 20, the resin layer 34 and the pinhole of the first metal layer 32 filled with the resin layer 34 can function as a permeation route of oxygen. Therefore, it is preferable that the resin layer 34 has a low oxygen permeability.

Specifically, the oxygen permeability of the resin layer 34 is preferably equal to or lower than 50 cc/(m$^2$·day·atm), more preferably equal to or lower than 10 cc/(m$^2$·day·atm), and even more preferably equal to or lower than 5 cc/(m$^2$·day·atm). The lower limit of the oxygen permeability of the resin layer 34 is not particularly limited, but specifically, the lower the lower limit, the more preferable. The oxygen permeability (oxygen transmission rate) is a value measured using an oxygen gas transmission rate-measuring device (manufactured by MOCON Inc, OX-TRAN 2/20: trade name) under the conditions of a measurement temperature of 23° C. and a relative humidity of 90%.

As an SI unit for the oxygen permeability, fm/(s·Pa) can be used. 1 fm/(s·Pa) can be converted into 8.752 cc/(m$^2$·day·atm). fm is read as femtometer, and 1 fm equals $10^{-15}$ m.

As described above, the resin layer 34 can be a permeation route of oxygen. Therefore, as shown in FIG. 1, as the end face sealing layer, a constitution is particularly preferable in which the resin layer 34 is covered with the first metal layer 32 and the second metal layer 36. In a case where such a constitution is adopted, it is possible to sufficiently inhibit oxygen from permeating the wavelength conversion layer even though the oxygen permeability of the resin layer 34 is not low enough.

In the example shown in FIG. 1, a constitution is illustrated in which in a cross-section perpendicular to the extension direction of each of the end faces 5a of the laminate 5, the shape of the end resin layer 34 (hereinafter, referred to as a cross-sectional shape of the resin layer as well) is approximately semicircular. However, the present invention is not limited thereto, and the cross-sectional shape of the resin layer may be a shape formed of a portion of a circle, a semielliptical shape, a semi-rounded rectangular shape (semiovale shape), a shape formed of a portion of these shapes, or an approximately rectangular shape as shown in FIG. 4.

The resin material forming the resin layer 34 is not limited, but is preferably a known resin material which has an oxygen permeability of equal to or lower than 50 cc/(m$^2$·day·atm) and can form the resin layer 34.

The resin layer 34 is preferably formed by preparing a composition, which contains a resin material (a monomer, a dimer, a trimer, an oligomer, a polymer, and the like), an additive such as a cross-linking agent or a surfactant added if necessary, an organic solvent, and the like, coating a surface for forming the resin layer 34 with the composition, drying the composition, and, if necessary, polymerizing (cross-linking•curing) the resin material by ultraviolet irradiation, heating, and the like.

It is preferable that the composition for forming the resin layer 34 contains a polymerizable compound or additionally contains a hydrogen bonding compound. The polymerizable compound is a compound having polymerization properties, and the hydrogen bonding compound is a compound having hydrogen bonding properties.

A log P value of a degree of hydrophilicity of the polymerizable compound and the hydrogen bonding compound contained in the composition for forming the resin layer 34 is preferably equal to or smaller than 4, and more preferably equal to or smaller than 3.

In the present invention, the Log P value showing a degree of hydrophilicity is a logarithm of a partition coefficient of 1-octanol/water. The Log P value can be calculated by a fragment method, an atomic approach method, and the like. The Log P value described in the present specification is a Log P value calculated from the structure of a compound by using ChemBioDraw Ultra 12.0 manufactured by CambridgeSoft Corporation. In order to further improve the adhesion between the resin layer 34 and the first metal layer 32, it is preferable that the resin layer 34 is formed of a hydrophobic compound.

As it is known, the smaller the log P value of a degree of hydrophilicity of a compound, the higher the hydrophilicity of the compound. That is, in order to form a resin layer 34 having strong adhesion with respect to the first metal layer 32, it is preferable that the polymerizable compound or the hydrogen bonding compound as a main component of the end resin layer 34 has a large log P value of a degree of hydrophilicity.

In contrast, a resin formed of a compound having high hydrophobicity has a high oxygen permeability. Therefore, in view of the oxygen permeability of the resin layer, it is preferable that the polymerizable compound or the hydrogen bonding compound as a main component of the resin layer has a small log P value of a degree of hydrophilicity.

Accordingly, in a case where the resin layer 34 is formed using a polymerizable compound and a hydrogen bonding compound having a log P value of a degree of hydrophilicity of equal to or smaller than 4, it is possible to form a resin layer 34 having a sufficiently low oxygen permeability while securing strong adhesion with respect to the first metal layer 32 by appropriate hydrophobicity.

In view of the oxygen permeability, it is preferable that the polymerizable compound and the hydrogen bonding compound have a small log P value of a degree of hydrophilicity. However, in a case where the log P value of a degree of hydrophilicity is too small, the hydrophilicity may be too high, the adhesion between the resin layer 34 and the first metal layer 32 may be weakened, and the durability of resin layer 34 may deteriorate.

Considering the above points, the log P value of a degree of hydrophilicity of the polymerizable compound and the hydrogen bonding compound is preferably equal to or greater than 0.0, and more preferably equal to or greater than 0.5.

The composition forming the resin layer 34 contains the hydrogen bonding compound, preferably in an amount of equal to or greater than 30 parts by mass and more preferably in an amount of equal to or greater than 40 parts by mass provided that the total amount of solid contents in the composition is 100 parts by mass.

The total amount of solid contents in the composition is the total amount of components that should remain in the resin layer 34 to be formed, except for an organic solvent in the composition.

In a case where the solid contents in the composition forming the resin layer 34 contain a hydrogen bonding compound in an amount of equal to or greater than 30 parts by mass, the oxygen permeability can be reduced by strengthening the intermolecular interaction.

A hydrogen bond refers to a non-covalent bond that is formed between a hydrogen atom, which forms a covalent bond with an atom having electronegativity higher than that of the hydrogen atom in a molecule, and another atom or atomic group in the same molecule or different molecules by attractive interaction.

The functional group having hydrogen bonding properties is a functional group containing a hydrogen atom which can form such a hydrogen bond. Specific examples of the functional group include a urethane group, a urea group, a hydroxyl group, a carboxyl group, an amide group, a cyano group, and the like.

Specific examples of compounds having these functional groups include monomers and oligomers which are obtained by reacting diisocyanate such as tolylene diisocyanate (TDI), diphenylmethane diisocyanate (MDI), hexamethylene diisocyanate (HDI), isophorone diisocyanate (IPDI), and hydrogenated MDI (HMDI) with polyol such as poly (propyleneoxide)diol, poly(tetramethyleneoxide)diol, ethoxylated bisphenol A, ethoxylated bisphenol S spiroglycol, caprolactone-modified diol, and carbonate diol and hydroxyacrylate such as 2-hydroxyethyl (meth)acrylate, 2-hydroxypropyl (meth)acrylate, glycidyl di(meth)acrylate, and pentaerythritol triacrylate.

Examples of the aforementioned compounds also include an epoxy compound obtained by reacting a compound having an epoxy group with a compound such as a bisphenol A-type compound, a bisphenol S-type compound, a bisphenol F-type compound, an epoxidized oil-type compound, and a phenol novolac-type compound and an epoxy compound obtained by reacting alicyclic epoxy with an amine compound, an acid anhydride, and the like.

Examples of the aforementioned compounds also include a cationically polymerized substance of the aforementioned epoxy compound, polyvinyl alcohol (PVA), an ethylenevinyl alcohol copolymer (EVOH), a butanediol-vinyl alcohol copolymer, polyacrylonitrile, and the like.

Among these, a compound having an epoxy group and a compound obtained by reacting a compound having an epoxy group are preferable, because these compounds less experience cure shrinkage and have excellent adhesiveness with respect to the laminated film.

Provided that the total amount of solid contents in the composition is 100 parts by mass, the composition forming the resin layer 34 preferably contains a polymerizable compound having at least one polymerizable functional group selected from a (meth)acryloyl group, a vinyl group, a glycidyl group, an oxetane group, and an alicyclic epoxy group in an amount of equal to or greater than 5 parts by mass, and more preferably contains the polymerizable compound having these polymerizable functional groups in an amount of equal to or greater than 10 parts by mass.

In a case where the solid contents in the composition forming the resin layer 34 contain the polymerizable compound having at least one polymerizable functional group selected from a (meth)acryloyl group and the like in an amount of equal to or greater than 5 parts by mass, a resin layer 34 exhibiting excellent durability at a high temperature and a high humidity can be realized.

Specific examples of the polymerizable compound having a (meth)acryloyl group include neopentyl glycol di(meth) acrylate, 1,9-nonanediol di(meth)acrylate, tripropylene glycol di(meth)acrylate, ethylene glycol di(meth)acrylate, dicyclopentenyl (meth)acrylate, dicyclopentenyloxyethyl (meth) acrylate, dicyclopentanyl di(meth)acrylate, and the like.

Specific examples of the polymerizable compound having a glycidyl group, an oxetane group, an alicyclic epoxy group, or the like include bisphenol A diglycidyl ether, bisphenol F diglycidyl ether, hydrogenated bisphenol A diglycidyl ether, hydrogenated bisphenol F diglycidyl ether, 1,4-butanediol diglycidyl ether, 1,6-hexanediol diglycidyl ether, glycerin triglycidyl ether, trimethylolpropane triglycidyl ether, and the like.

In the present invention, as the polymerizable compound having a (meth)acryloyl group or a glycidyl group, commercially available products can be suitably used.

As the commercially available products including the polymerizable compound, MAXIVE manufactured by MITSUBISHI GAS CHEMICAL COMPANY, INC, NANOPDX 450, NANOPDX 500, and NANOPDX 630 manufactured by Evonik Industries, a series compounds such as COMPO-CERAN 102 manufactured by Arakawa Chemical Industries, Ltd, FLEP and THIOKOL LP manufactured by Toray Fine Chemicals Co., Ltd, a series of compounds such as LOCTITE E-30CL manufactured by Henkel Japan Ltd, a series of compounds such as EPO-TEX353ND manufactured by Epoxy Technology Inc, and the like can be suitably exemplified.

If necessary, the composition forming the resin layer 34 may contain a polymerizable compound which does not contain a (meth)acryloyl group, a vinyl group, a glycidyl group, an oxetane group, and an alicyclic epoxy group.

Here, provided that the total amount of solid contents in the composition forming the resin layer 34 is 100 parts by mass, the amount of the polymerizable compound, which does not contain the aforementioned functional groups, is preferably equal to or smaller than 3 parts by mass.

In order to make the resin layer 34 function as an underlayer (conductive layer) for forming the second metal layer 36 by plating, the resin layer 34 particularly preferably contains any of copper (Cu), aluminum (Al), palladium (Pd), silver (Ag), Gold (Au), and platinum (Pt) or contains metal nanoparticles 31 formed of an alloy of two or more kinds of these metals.

In a case where the resin layer 34 contains particles of an inorganic substance such as metal nanoparticles, the oxygen permeability of the resin layer 34 can be further reduced, and hence the deterioration of the wavelength conversion layer 10 resulting from oxygen or the like permeating from the end faces 10a can be more effectively prevented.

The size of the particles of an inorganic substance dispersed in the resin layer 34 is not limited, and may be appropriately set according to the thickness of the resin layer 34 or the like. The size (maximum length) of the particles of an inorganic substance dispersed in the resin layer 34 is preferably less than the thickness of the resin layer 34. Particularly, the smaller the size of the particles, the more advantageous.

The size of the particles of an inorganic substance dispersed in the resin layer 34 may be uniform or non-uniform.

The content of the particles of an inorganic substance in the resin layer 34 may be appropriately set according to the size of the particles of an inorganic substance or the like.

According to the examinations performed by the inventors of the present invention, the content of the particles of an inorganic substance in the resin layer 34 is preferably equal to or smaller than 50% by mass, and more preferably 10% to 30% by mass. That is, provided that the total amount of solid contents in the composition forming the resin layer 34 described above is 100 parts by mass, the content of the particles of an inorganic substance is preferably equal to or smaller than 50 parts by mass, and more preferably 10 to 30 parts by mass.

The greater the content of the particles of an inorganic substance is, the further the oxygen permeability of the resin layer 34 is effectively reduced by the particles of an inorganic substance. In a case where the content of the particles of an inorganic substance is equal to or greater than 10% by mass, the effect obtained by the addition of the particles of an inorganic substance becomes more suitable, and a resin layer 34 having a low oxygen permeability can be formed.

It is preferable that the content of the particles of an inorganic substance in the resin layer 34 is equal to or smaller than 50% by mass, because then the adhesiveness or the durability of the resin layer 34 can become sufficient, and the occurrence of cracking at the time of cutting or punching the laminated film can be inhibited.

As the particles of an inorganic substance dispersed in the resin layer 34, in addition to the aforementioned metal particles, particles formed of a metal oxide, such as silica particles and alumina particles, may also be used.

—Second Metal Layer—

The second metal layer 36 is a layer which mainly exhibits gas barrier properties in the end face sealing layer 30, and formed to cover the entire surface of the resin layer 34 (the entire surface of the resin layer 34 except for a surface coming into contact with the end faces of the laminate 5).

The material forming the second metal layer 36 is not limited as long as the material is a metal. The second metal layer 36 is preferably a metal layer formed by any method among a sputtering method, a vacuum vapor deposition method, an ion plating method, a plasma CVD method, and a metal plating treatment.

Specifically, the material forming the second metal layer 36 is preferably either at least one kind of metal selected from the group consisting of aluminum, titanium, chromium, nickel, tin, copper, silver, and gold or an alloy containing at least one kind of metal among the above metals.

Particularly, it is preferable that the second metal layer 36 is formed by a metal plating treatment, because then a thick second metal layer 36 can be formed, high gas barrier properties can be secured, the productivity becomes high, and the second metal layer 36 having a uniform thickness can be easily formed on the entire surface of the resin layer 34 even though the surface of the resin layer 34 is a curved surface. That is, the second metal layer 36 is particularly preferably an electroless plating layer.

As the method of the metal plating treatment for forming the second metal layer 36, it is possible to use known methods such as an electroplating treatment and an electroless plating treatment. Among these, it is more preferable to use an electroless plating treatment for forming the second metal layer 36, because then a second metal layer 36 having a uniform thickness can be easily formed simply by immersing the laminate 5 into a plating liquid, and the second metal layer 36 can be easily formed.

Examples of metal materials suitable for forming the second metal layer 36 by the electroless plating treatment include nickel, copper, tin, gold, and the like.

From the viewpoint of securing gas barrier properties, productivity, and the like, the thickness of the metal layer 36 is preferably 0.05 μm to 100 μm, and more preferably 1 μm to 20 μm.

From the viewpoint of securing gas barrier properties, it is preferable that the number of pinholes in the second metal layer 36 is small. The definition of a pinhole is as described above. The number of pinholes is preferably equal to or smaller than 50 pinholes/mm$^2$, more preferably equal to or smaller than 20 pinholes/mm$^2$, and particularly preferably equal to or smaller than 5 pinholes/mm$^2$. The smaller the number of pinholes, the more preferable. The lower limit of the number of pinholes is not particularly limited.

In the wavelength conversion laminated film of the present invention, similarly to the example end face sealing layer shown in FIG. 4, according to the formation method of the second metal layer 36, if necessary, an underlayer 35 may be provided on the surface of the resin layer 34. In a case where the second metal layer 36 is formed by the electroplating treatment or the electroless plating treatment, the surface for forming the second metal layer 36 needs to have conductivity.

For example, in a case where the metal layer 36 is formed by the electroplating treatment, as a member functioning as an electrode (cathode) at the time of the electroplating treatment, the underlayer 35 having high conductivity is provided.

Furthermore, in a case where the metal layer 36 is formed by the electroless plating treatment, in order to improve the adhesiveness between the end faces of the laminate 5 and the plating formed by the electroless plating treatment, the underlayer 35 having high conductivity is provided.

In a case where the resin layer 34 contains metal nanoparticles and has conductivity, the underlayer is not necessary.

The formation method and the material of such an underlayer 35 having high conductivity are not limited. Examples of the underlayer 35 include a resin layer containing conductive particles that is formed by a method of coating the resin layer 34 with a conductive paint in which fine particles having high conductivity such as metal nanoparticles are dispersed and a layer having high conductivity such as a metal that is formed by a sputtering method, a vacuum vapor deposition method, an ion plating method, a plasma CVD method, and the like.

Examples of the conductive paint used as a material of the underlayer 35 include a plating primer containing colloidal palladium (nucleophilic catalyst) or the like as a main component.

As the material forming the layer which can be formed by any of the methods among a sputtering method, a vacuum vapor deposition method, an ion plating method, and a plasma CVD method, either at least one kind of metal selected from the group consisting of aluminum, titanium, chromium, copper, and nickel or an alloy containing at least one kind of metal of these is preferable, and either at least one kind of metal selected from the group consisting of aluminum, titanium, and chromium or an alloy containing at least one kind of metal among these is particularly preferable. Presumably, in a case where a metal (aluminum, titanium, or chromium) having high ionization tendency is used, an oxide of a metal or a nitride of a metal may be easily formed in the interface between the metal and a resin, and hence the adhesiveness may be improved.

It is preferable that the underlayer 35 is formed by a method of coating the resin layer 34 with the conductive paint because then the underlayer 35 is easily formed.

The thickness of the underlayer 35 is not particularly limited as long as the second metal layer 36 can be properly formed. From the viewpoint of the adhesiveness between the resin layer 34 and the second metal layer 36, the coating properties, and the like, the thickness of the underlayer 35 is preferably 0.1 µm to 1.0 µm.

Hereinafter, the wavelength conversion layer 10 and the gas barrier layer 20 as elements of the laminate 5 will be specifically described.

[Wavelength Conversion Layer]

The wavelength conversion layer 10 is a layer performing a wavelength conversion function that emits fluorescence by being irradiated with excitation light. For example, the wavelength conversion layer 10 is a sheet-like substance having a quadrangular planar shape.

The wavelength conversion layer 10 is a layer containing the phosphors 11 such as quantum dots, which are used in LCD or the like assumed to be used in various environments such as an in-vehicle environment with a high temperature and a high humidity and in which the deterioration of the optical characteristics thereof resulting from oxygen becomes a big issue. More specifically, the wavelength conversion layer 10 is a layer obtained by dispersing a number of phosphors 11 in a matrix 12. For instance, in a case where blue light is incident on the wavelength conversion layer 10, by the effect of the phosphors 11 contained in the wavelength conversion layer 10, the wavelength conversion layer 10 performs wavelength conversion, such that at least a portion of the blue light becomes red light or green light, and emits the light.

Herein, the blue light refers to light having an emission wavelength centered at a wavelength range equal to or longer than 400 nm and equal to or shorter than 500 nm, the green light refers to light having an emission wavelength centered at a wavelength range longer than 500 nm and equal to or shorter than 600 nm, and the red light refers to light having an emission wavelength centered at a wavelength range longer than 600 nm and equal to or shorter than 680 nm.

The wavelength conversion function that the wavelength conversion layer performs is not limited to the constitution in which the wavelength conversion is performed to change the blue light into the red light or the green light, and only at least a portion of incidence rays needs to be converted into light having a different wavelength.

As the phosphors 11 that deteriorate by reacting with oxygen in a case where the phosphors 11 are exposed to oxygen, various known phosphors can be used. Examples thereof include inorganic phosphors such as rare earth-doped garnet, silicate, aluminate, phosphate, ceramic phosphors, sulfide phosphors, and nitride phosphors, organic fluorescent substances including organic fluorescent dyes and organic fluorescent pigments, and the like. The phosphors obtained by doping semiconductor fine particles with rare earth and fine nanoparticles (quantum dots) of semiconductors can also be suitably used. One kind of phosphors may be used singly, or a plurality of kinds of phosphors having different wavelengths may be used by being mixed together such that a desired fluorescence spectrum is obtained. Alternatively, a combination of phosphors constituted with different materials (for example, a combination of rare-earth-doped garnet and a quantum dot) may be used.

Being exposed to oxygen means being exposed to an oxygen-containing environment such as the atmosphere. The deterioration of phosphors by the reaction with oxygen means that the phosphors are oxidized and hence the performance of the phosphors deteriorates (is reduced). The deterioration mainly means that the light emitting performance is further reduced than before the phosphors react with oxygen. In a case where phosphors are used as a photoelectric converter, the deterioration means that the photoelectric conversion efficiency is further reduced than before the phosphors react with oxygen.

The wavelength conversion laminated film of the present invention has an end face sealing layer, and accordingly, the deterioration of optical characteristics resulting from oxygen, moisture, or the like permeating from end faces can be prevented. Because the aforementioned prevention of optical characteristic deterioration, which is a feature of the wavelength conversion laminated film of the present invention, can be sufficiently expressed, it is particularly preferable to use quantum dots as phosphors.

Hereinafter, a case where the wavelength conversion layer 10 contains quantum dots as the phosphors 11 will be described. In the following description, the wavelength conversion layer containing quantum dots will be referred to as a quantum dot layer in some cases.

The type of quantum dots contained in the wavelength conversion layer 10 is not particularly limited, and according to the required wavelength conversion performance or the like, various known quantum dots may be appropriately selected.

Regarding the quantum dots, for example, paragraphs "0060" to "0066" in JP2012-309271A can be referred to, but the present invention is not limited to the quantum dots described in the document. As the quantum dots, commercially available products can be used without any restriction. Generally, the emission wavelength of the quantum dots can be adjusted by the composition or size of the particles.

Although it is preferable that quantum dots are evenly dispersed in a matrix, the quantum dots may be unevenly dispersed in the matrix.

Furthermore, one kind of quantum dot may be used singly, or two or more kinds of quantum dots may be used in combination. In a case where two or more kinds of quantum dots are used in combination, quantum dots that emit light having different wavelengths may be used.

Specifically, known quantum dots include a quantum dot (A) having an emission wavelength centered at a wavelength range longer than 600 nm and equal to or shorter than 680 nm, a quantum dot (B) having an emission wavelength centered at a wavelength range longer than 500 nm and equal to or shorter than 600 nm, and a quantum dot (C) having a emission wavelength centered at a wavelength range equal to or longer than 400 nm and equal to or shorter than 500 nm. The quantum dot (A) emits red light by being excited with excitation light, the quantum dot (B) emits green light, and the quantum dot (C) emits blue light. For example, in a case where blue light is caused to incident as excitation light on a quantum dot-containing laminate containing the quantum dot (A) and the quantum dot (B), by the red light emitted from the quantum dot (A), the green light emitted from the quantum dot (B), and the blue light transmitted through the quantum dot layer, white light can be realized. Furthermore, in a case where ultraviolet light is caused to incident as excitation light on the quantum dot layer containing the quantum dots (A), (B), and (C), by the red light emitted from the quantum dot (A), the green light emitted from the quantum dot (B), and the blue light emitted from the quantum dot (C), white light can be realized.

As quantum dots, so-called quantum rods which have a rod shape and emit polarized light with directionality or tetrapod-type quantum dots may be used.

The matrix 12 of the wavelength conversion layer 10 is not particularly limited, and can be formed of various resins used in wavelength conversion layers having known phosphors. The matrix 12 can be formed by preparing a composition (matrix raw material) containing a resin material, an additive such as a cross-linking agent or a surfactant which is added if necessary, an organic solvent, and the like, performing coating by using the matrix raw material, and then curing the matrix raw material.

The following examples of the matrix raw material are preferably suitable for quantum dots, but the examples can be applied not only to quantum dots but also to various phosphors described above.

The matrix raw material mainly includes, for example, a polyester-based resin (for example, polyethylene terephthalate and polyethylene naphthalate), a (meth)acrylic resin, a polyvinyl chloride-based resin, a polyvinylidene chloride-based resin, and the like.

As the matrix raw material, it is possible to use the aforementioned resin or a composition containing a curable compound having a polymerizable group. The type of the polymerizable group is not limited, but the polymerizable group is preferably a (meth)acrylate group, a vinyl group, or an epoxy group, more preferably a (meth)acrylate group, and particularly preferably an acrylate group. In a polymerizable monomer having two or more polymerizable groups, the polymerizable groups may be the same as or different from each other.

Specifically, as the matrix raw material, a first polymerizable compound and a second polymerizable compound described below can be exemplified.

The first polymerizable compound is preferably one or more compounds selected from the group consisting of a (meth)acrylate monomer having two or more functional groups and a monomer having two or more functional groups selected from the group consisting of an epoxy group and an oxetanyl group.

Examples of the (meth)acrylate monomer having two or more functional groups preferably include difunctional (meth)acrylate monomers such as neopentyl glycol di(meth)acrylate, 1,9-nonanediol di(meth)acrylate, tripropylene glycol di(meth)acrylate, ethylene glycol di(meth)acrylate, tetraethylene glycol di(meth)acrylate, hydroxypivalic acid neopentyl glycol di(meth)acrylate, polyethylene glycol di(meth)acrylate, dicyclopentenyl (meth)acrylate, dicyclopentenyloxyethyl (meth)acrylate, and dicyclopentanyl di(meth)acrylate.

Examples of the (meth)acrylate monomer having two or more functional groups preferably include (meth)acrylate monomers having three or more functional groups such as epichlorohydrin (ECH)-modified glycerol tri(meth)acrylate, ethylene oxide (EO)-modified glycerol tri(meth)acrylate, propylene glycol (PO)-modified glycerol tri(meth)acrylate, pentaerythritol triacrylate, pentaerythritol tetraacrylate, EO-modified phosphoric acid triacrylate, trimethylolpropane tri(meth)acrylate, caprolactone-modified trimethylolpropane tri(meth)acrylate, EO-modified trimethylolpropane tri(meth)acrylate, PO-modified trimethylolpropane tri(meth)acrylate, tris(acryloxyethyl)isocyanurate, dipentaerythritol hexa(meth)acrylate, dipentaerythritol penta(meth)acrylate, caprolactone-modified dipentaerythritol hexa(meth)acrylate, dipentaerythritol hydroxypenta(meth)acrylate, alkyl-modified dipentaerythritol penta(meth)acrylate, dipentaerythritol poly(meth)acrylate, alkyl-modified dipentaerythritol tri(meth)acrylate, ditrimethylolpropane tetra(meth)acrylate, pentaerythritol ethoxy tetra(meth)acrylate, and pentaerythritol tetra(meth)acrylate.

As the monomer having two or more functional groups selected from the group consisting of an epoxy group and an oxetanyl group, an aliphatic cyclic epoxy compound, bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, hydrogenated bisphenol A diglycidyl ether, hydrogenated bisphenol F diglycidyl ether, hydrogenated bisphenol S diglycidyl ether, 1,4-butanediol diglycidyl ether, 1,6-hexanediol diglycidyl ether, glycerin triglycidyl ether, trimethylolpropane triglycidyl ether, polyethylene glycol diglycidyl ether, polypropylene glycol diglycidyl ethers; polyglycidyl ethers of polyether polyol obtained by adding one kind or two or more kinds of alkylene oxide to an aliphatic polyhydric alcohol such as ethylene glycol, propylene glycol, or glycerin; diglycidyl esters of aliphatic long-chain dibasic acid; glycidyl esters of higher fatty acids; a compound containing epoxycycloalkane, and the like are suitably used.

Examples of commercially available products that can be suitably used as the monomer having two or more functional groups selected from the group consisting of an epoxy group and an oxetanyl group include CELLOXIDE 2021P and CELLOXIDE 8000 manufactured by Daicel Corporation, 4-vinylcyclohexene dioxide manufactured by Sigma-Aldrich Co. LLC., and the like. One kind of these monomers can be used singly, or two or more kinds of these monomers can be used in combination.

The monomer having two or functional groups selected from the group consisting of an epoxy group and an oxetanyl group may be prepared by any method. For example, the monomer can be synthesized with reference to the documents such as "Experimental Chemistry Course 20, Organic Synthesis II", pp. 213~, 1992, MARUZEN SHUPPAN K.K, "The chemistry of heterocyclic compounds-Small Ring Heterocycles, part 3 Oxiranes", Ed. By Alfred Hasfner, 1985, John & Wiley and sons, An Interscience Publication, New York, 1985, "Adhesion", Yoshimura, Vol. 29, No. 12, 32, 1985, "Adhesion", Yoshimura, Vol. 30, No. 5, 42, 1986, "Adhesion", Yoshimura, Vol. 30, No. 7, 42, 1986, JP1999-100378A (JP-H11-100378A), JP2906245B, and JP2926262B.

The second polymerizable compound has a functional group which has hydrogen bonding properties in a molecule and a polymerizable group which can cause a polymerization reaction with the first polymerizable compound.

Examples of the functional group having hydrogen bonding properties include a urethane group, a urea group, a hydroxyl group, and the like.

In a case where the first polymerizable compound is a (meth)acrylate monomer having two or more functional groups, the polymerizable group which can cause a polymerization reaction with the first polymerizable compound may be a (meth)acryloyl group, for example. In a case where the first polymerizable compound is a monomer having two or more functional groups selected from the group consisting of an epoxy group and an oxetanyl group, the polymerizable group which can cause a polymerization reaction may be an epoxy group or an oxetanyl group.

Examples of the (meth)acrylate monomer containing a urethane group include monomers and oligomers obtained by reacting diisocyanate such as TDI, MDI, HDI, IPDI, and HMDI with any of polyol such as poly(propyleneoxide)diol, poly(tetramethyleneoxide)diol, ethoxylated bisphenol A, ethoxylated bisphenol S spiroglycol, caprolactone-modified diol, and carbonate diol and hydroxyacrylate such as 2-hydroxyethyl (meth)acrylate, 2-hydroxypropyl (meth)acrylate, glycidol di(meth)acrylate, and pentaerythritol triacrylate, and polyfunctional urethane monomers described in JP2002-265650A, JP2002-355936A, JP2002-067238A, and the like. Specifically, examples thereof include an adduct of TDI and hydroxyethyl acrylate, an adduct of IPDI and hydroxyethyl acrylate, an adduct of HDI and pentaerythritol triacrylate (PETA), a compound obtained by making an adduct of TDI and PETA and reacting the remaining isocyanate with dodecyloxyhydroxypropyl acrylate, an adduct of 6,6 nylon and TDI, an adduct of pentaerythritol, TDI, and hydroxyethyl acrylate, and the like, but the present invention is not limited to these.

Examples of commercially available products that can be suitably used as the (meth)acrylate monomer containing a urethane group include AH-600, AT-600, UA-306H, UA-306T, UA-306I, UA-510H, UF-8001G, and DAUA-307 manufactured by KYOEISHA CHEMICAL Co., LTD, UA-300™ manufactured by SHIN-NAKAMURA CHEMICAL CO., LTD., UV-4108F and UV-4117F manufactured by OSAKA ORGANIC CHEMICAL INDUSTRY LTD, and the like. One kind of these monomers can be used singly, or two or more kinds of these monomers can be used in combination.

Examples of the (meth)acrylate monomer containing a hydroxyl group include a compound synthesized by causing a reaction between a compound having an epoxy group and (meth)acrylic acid. Typical examples of the monomer are classified into, depending on the compound having an epoxy group, a bisphenol A type, a bisphenol S type, a bisphenol F type, an epoxidized oil type, a phenol novolac type, and alicyclic type. Specific examples of the monomer include (meth)acrylate obtained by reacting an adduct of bisphenol A and epichlorohydrin with (meth)acrylic acid, (meth)acrylate obtained by reacting phenol novolac with epichlorohydrin and then reacting the product with (meth)acrylic acid, (meth)acrylate obtained by reacting an adduct of bisphenol S and epichlorohydrin with (meth)acrylic acid, (meth)acrylate obtained by reacting epoxidized soybean oil with (meth) acrylic acid, and the like. Examples of the (meth)acrylate monomer having a hydroxyl group also include a (meth) acrylate monomer having a carboxyl group or a phosphoric acid group on the terminal, and the like, but the present invention is not limited thereto.

Examples of commercially available products that can be suitably used as the second polymerizable compound containing a hydroxyl group include epoxy ester, M-600A, 40EM, 70PA, 200PA, 80MFA, 3002M, 3002A, 3000MK, and 3000A manufactured by KYOEISHA CHEMICAL Co., LTD, 4-hydroxybutyl acrylate manufactured by Nippon Kasei Chemical Co., Ltd, monofunctional acrylate A-SA and monofunctional methacrylate SA manufactured by SHIN-NAKAMURA CHEMICAL CO., LTD., monofunctional acrylate β-carboxyethyl acrylate manufactured by DAICEL-ALLNEX LTD., JPA-520 manufactured by JOHOKU CHEMICAL CO., LTD, and the like. One kind of these can be used singly, or two or more kinds of these can be used in combination.

A mass ratio of first polymerizable compound:second polymerizable compound may be 10:90 to 99:1, and is preferably 10:90 to 90:10. It is preferable that the content of the first polymerizable compound is greater than the content of the second polymerizable compound. Specifically, (content of first polymerizable compound)/(content of second polymerizable compound) is preferably 2 to 10.

In a case where the matrix raw material containing the first polymerizable compound and the second polymerizable compound is used, it is preferable that the matrix raw material further contains a monofunctional (meth)acrylate monomer. Examples of the monofunctional (meth)acrylate monomer include acrylic acid, methacrylic acid, and derivatives of these, and more specifically include a monomer having one polymerizable unsaturated bond ((meth)acryloyl group) of (meth)acrylic acid in a molecule. Specific examples of the monomer include the following compounds, but the present invention is not limited thereto.

Examples of the monomer include alkyl (meth)acrylate containing an alkyl group having 1 to 30 carbon atoms such as methyl (meth)acrylate, n-butyl (meth)acrylate, isobutyl (meth)acrylate, 2-ethylhexyl (meth)acrylate, isononyl (meth)acrylate, n-octyl (meth)acrylate, lauryl (meth)acrylate, and stearyl (meth)acrylate; aralkyl (meth)acrylate containing an aralkyl group having 7 to 20 carbon atoms, such as benzyl (meth)acrylate; alkoxyalkyl (meth)acrylate containing an alkoxyalkyl group having 2 to 30 carbon atoms, such as butoxyethyl (meth)acrylate; aminoalkyl (meth)acrylate containing a (monoalkyl or dialkyl) aminoalkyl group having 1 to 20 carbon atoms in total, such as N,N-dimethylaminoethyl (meth)acrylate; (meth)acrylate of polyalkylene glycol alkyl ether containing an alkylene chain having 1 to 10 carbon atoms and terminal alkyl ether having 1 to 10 carbon atoms, such as (meth)acrylate of diethylene glycol ethyl ether, (meth)acrylate of triethylene glycol butyl ether, (meth)acrylate of tetraethylene glycol monomethyl ether, (meth)acrylate of hexaethylene glycol monomethyl ether, monomethyl ether (meth)acrylate of octaethylene glycol, monomethyl ether (meth)acrylate of nonaethylene glycol, monomethyl ether (meth)acrylate of dipropylene glycol, monomethyl ether (meth)acrylate of heptapropylene glycol, and monoethyl ether (meth)acrylate of tetraethylene glycol; (meth)acrylate of polyalkylene glycol aryl ether containing an alkylene chain having 1 to 30 carbon atoms and terminal aryl ether having 6 to 20 carbon atoms, such as (meth) acrylate of hexaethylene glycol phenyl ether; (meth)acrylate having an alicyclic structure containing 4 to 30 carbon atoms in total, such as cyclohexyl (meth)acrylate, dicyclopentanyl (meth)acrylate, isobornyl (meth)acrylate, and methylene oxide-added cyclodecatriene (meth)acrylate; fluorinated alkyl (meth)acrylate having 4 to 30 carbon atoms in total such as heptadecafluorodecyl (meth)acrylate; (meth)acrylate having a hydroxyl group such as 2-hydroxyethyl (meth) acrylate, 3-hydroxypropyl (meth)acrylate, 4-hydroxybutyl (meth)acrylate, mono(meth)acrylate of triethylene glycol, tetraethylene glycol mono(meth)acrylate, hexaethylene glycol mono(meth)acrylate, octapropylene glycol mono(meth) acrylate, and mono- or di(meth)acrylate of glycerol; (meth) acrylate having a glycidyl group such as glycidyl (meth) acrylate; polyethylene glycol mono(meth)acrylate having an alkylene chain containing 1 to 30 carbon atoms, such as tetraethylene glycol mono(meth)acrylate, hexaethylene glycol mono(meth)acrylate, and octapropylene glycol mono (meth)acrylate; (meth)acrylamide such as (meth)acrylamide, N,N-dimethyl (meth)acrylamide, N-isopropyl (meth) acrylamide, 2-hydroxyethyl (meth)acrylamide, and acryloylmorpholine; and the like.

The content of the monofunctional (meth)acrylate monomer with respect to the total mass (100 parts by mass) of the first polymerizable compound and the second polymerizable compound is preferably 1 to 300 parts by mass, and more preferably 50 to 150 parts by mass.

Furthermore, it is preferable that the matrix raw material contains a compound having a long-chain alkyl group containing 4 to 30 carbon atoms. Specifically, it is preferable that at least any one of the first polymerizable compound, the second polymerizable compound, or the monofunctional (meth)acrylate monomer has a long-chain alkyl group having 4 to 30 carbon atoms. It is preferable that long-chain alkyl group is a long-chain alkyl group having 12 to 22 carbon atoms, because then the dispersibility of the quantum dots is improved. The further the dispersibility of the quantum dots is improved, the further the amount of light that goes straight to an emission surface from a light conversion layer increases. Accordingly, the improvement of the dispersibility of the quantum dots is effective for improving front luminance and front contrast.

Specifically, as the monofunctional (meth)acrylate monomer having a long-chain alkyl group containing 4 to 30 carbon atoms, butyl (meth)acrylate, octyl (meth)acrylate, lauryl (meth)acrylate, oleyl (meth)acrylate, stearyl (meth) acrylate, behenyl (meth)acrylate, butyl (meth)acrylamide, octyl (meth)acrylamide, lauryl (meth)acrylamide, oleyl (meth)acrylamide, stearyl (meth)acrylamide, behenyl (meth)acrylamide, and the like are preferable. Among these, lauryl (meth)acrylate, oleyl (meth)acrylate, and stearyl (meth)acrylate are particularly preferable.

Furthermore, the matrix raw material may contain a compound having a fluorine atom such as trifluoroethyl (meth)acrylate, pentafluoroethyl (meth)acrylate, (perfluorobutyl)ethyl (meth)acrylate, perfluorobutyl-hydroxypropyl (meth)acrylate, (perfluorohexyl)ethyl (meth)acrylate, octafluoropentyl (meth)acrylate, perfluorooctyl ethyl (meth) acrylate, and tetrafluoropropyl (meth)acrylate. In a case where the matrix raw material contains these compounds, the coating properties can be further improved.

The total amount of the matrix in the quantum dot layer is not limited. The total amount of the matrix with respect to a total of 100 parts by mass of the quantum dot layer is preferably 90 to 99.9 parts by mass, and more preferably 92 to 99 parts by mass.

The thickness of the quantum dot layer may be appropriately set according to the thickness of the laminated film 1 or the like. According to the examination performed by the inventors of the present invention, in view of handleability and emission characteristics, the thickness of the quantum dot layer is preferably 5 to 200 µm, and more preferably 10 to 150 µm.

The aforementioned thickness means an average thickness which can be determined by measuring thicknesses of ten or more random spots in the quantum dot layer and calculating an arithmetic mean thereof.

The method for forming the quantum dot layer is not limited, and the quantum dot layer may be formed by a known method. For example, the quantum dot layer can be formed by preparing a coating composition by means of mixing quantum dots, a resin composition which becomes a matrix, and a solvent together, coating the gas barrier layer 20 with the coating composition, and curing the coating composition.

If necessary, a polymerization initiator, a silane coupling agent, and the like may be added to the coating composition.

<Gas Barrier Layer>

The gas barrier layer 20 is a layer for inhibiting the permeation of oxygen or the like from the main surface of the wavelength conversion layer 10 such as a quantum dot layer. Accordingly, it is preferable that the gas barrier layer 20 has high gas barrier properties. Specifically, an oxygen permeability of the gas barrier layer 20 is preferably equal to or lower than 0.1 cc/(m²·day·atm), more preferably equal to or lower than 0.01 cc/(m²·day·atm), and particularly preferably equal to or lower than 0.001 cc/(m²·day·atm).

In a case where the oxygen permeability of the gas barrier layer 20 is equal to or lower than 0.1 cc/(m²·day·atm), it is possible to effectively inhibit the deterioration of the wavelength conversion layer 10 (particularly, the deterioration of phosphors) caused by oxygen or the like permeating from the main surface of the wavelength conversion layer 10 and to obtain a wavelength conversion laminated film such as a quantum dot film having long service life.

In the present invention, the oxygen permeability of the gas barrier layer 20, the end face sealing layer 30, or the like may be measured based on known methods or the examples which will be described later.

As the gas barrier layer 20, various materials such as a layer (film) formed of a known material exhibiting gas barrier properties and a known gas barrier film can be used, as long as the materials have sufficient optical characteristics in view of transparency or the like and yield intended gas barrier properties (oxygen barrier properties).

As a preferred gas barrier layer 20, a gas barrier film can be exemplified which has an organic and inorganic laminated structure obtained by alternately laminating an organic layer and an inorganic layer on a support (on one surface or both surfaces of a support).

Figure 5:
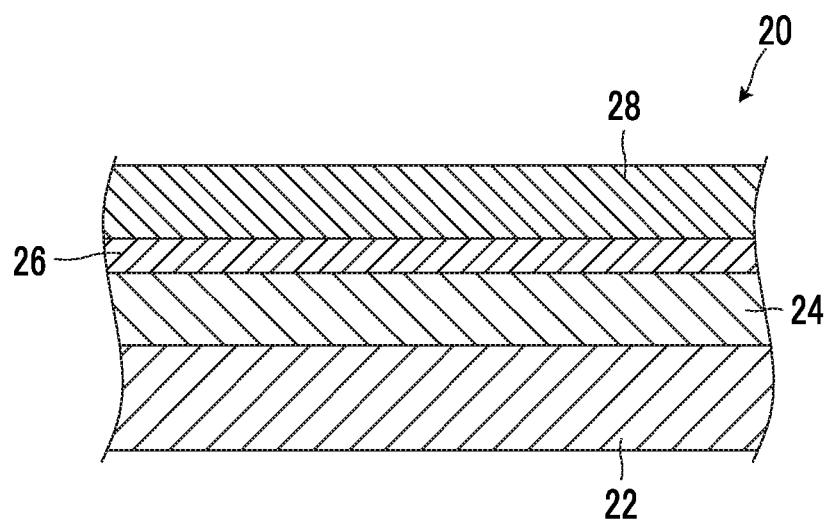
FIG. 5 is a cross-sectional view schematically showing the constitution of still another example of the wavelength conversion laminated film of the present invention.

FIG. 5 schematically shows a cross-section of an example of the gas barrier layer 20.

The gas barrier layer 20 shown in FIG. 5 is a gas barrier film having an organic layer 24 on a support 22, an inorganic layer 26 on the organic layer 24, and an organic layer 28 on the inorganic layer 26.

In the gas barrier layer 20 (gas barrier film), gas barrier properties are mainly exhibited by the inorganic layer 26. The organic layer 24 as an underlayer of the inorganic layer 26 is an underlayer for appropriately forming the inorganic layer 26. The organic layer 28 as an uppermost layer functions as a protective layer for the inorganic layer 26.

In the laminated film of the present invention, the gas barrier layer is not limited to the example shown in FIG. 5.

For example, the gas barrier layer may not have the organic layer 28 as an uppermost layer that functions as a protective layer.

Furthermore, although the gas barrier layer in the example shown in FIG. 5 has only one combination of the inorganic layer and the organic layer as a base, the gas barrier layer may have two or more combinations of the inorganic layer and the organic layer as a base. Generally, the larger the number of combinations of the inorganic layer and the organic layer as a base, the higher the gas barrier properties.

In addition, a constitution may be adopted in which an inorganic layer is formed on the support 22, and one or more combinations of an inorganic layer and an organic layer as a base are provided on the aforementioned inorganic layer.

As the support 22 of the gas barrier layer 20, it is possible to use various materials that are used as a support in known gas barrier films.

Among these, films formed of various resin materials (polymer materials) are suitably used, because these films make it easy to obtain a thin or lightweight support and are suitable for making a flexible support.

Specifically, plastic films formed of polyethylene (PE), polyethylene naphthalate (PEN), polyamide (PA), polyethylene terephthalate (PET), polyvinyl chloride (PVC), polyvinyl alcohol (PVA), polyacrylonitrile (PAN), polyimide (PI), transparent polyimide, a polymethyl methacrylate resin (PMMA), polycarbonate (PC), polyacrylate, polymethacrylate, polypropylene (PP), polystyrene (PS), acrylonitrile-butadiene-styrene copolymer synthetic resin (ABS), a cycloolefin copolymer (COC), a cycloolefin polymer (COP), and triacetyl cellulose (TAC) can be suitably exemplified.

The thickness of the support 22 may be appropriately set according to the thickness, size, and the like of the wavelength conversion laminated film 1. According to the examination performed by the inventors of the present invention, the thickness of the support 22 is preferably about 10 µm to 100 µm. In a case where the thickness of the support 22 is within the above range, in view of making a lightweight or thin support, preferable results are obtained.

To the surface of the plastic film of which the support 22 is formed, the functions of preventing reflection, controlling phase difference, improving light extraction efficiency, and the like may be imparted.

In the gas barrier layer 20 shown in FIG. 5, the organic layer 24 formed on the surface of the support 22, that is, the organic layer 24 which becomes the underlayer of the inorganic layer 26 becomes a foundation layer of the inorganic layer 26.

In a case where the gas barrier layer 20 has the organic layer 24, the surface asperities of the support 22, foreign substances having adhered to the surface of the support 22, and the like are concealed, and hence a deposition surface for the inorganic layer 26 can be in a state suitable for forming the inorganic layer 26. Accordingly, it is possible to form an appropriate inorganic layer 26 without voids on the entire surface of the substrate, by removing regions, on which an inorganic compound that becomes the inorganic layer 26 is not easily deposited as a film, such as surface asperities or shadows of foreign substances on the support 22. As a result, a gas barrier layer 20 having an oxygen permeability of equal to or lower than 0.1 cc/(m²·day·atm) can be stably formed.

In the gas barrier layer 20, as the material for forming the organic layer 24, various known organic compounds can be used without restriction.

Specifically, thermoplastic resins such as polyester, a (meth)acrylic resin, a methacrylic acid-maleic acid copolymer, polystyrene, a transparent fluorine resin, polyimide, fluorinated polyimide, polyamide, polyamide imide, polyether imide, cellulose acylate, polyurethane, polyether ether ketone, polycarbonate, alicyclic polyolefin, polyarylate, polyether sulfone, polysulfone, fluorene ring-modified polycarbonate, alicyclic ring-modified polycarbonate, fluorene ring-modified polyester, and an acryl compound, polysiloxane, and films of other organic silicon compounds can be suitably exemplified. A plurality of these materials may be used in combination.

Among these, in view of excellent glass transition temperature or hardness, an organic layer 24 is suitable which is constituted with a polymer of a radically curable compound and/or a cationically curable compound having an ether group as a functional group.

Particularly, an acrylic resin or a methacrylic resin, which contains a polymer of a monomer or an oligomer of acrylate and/or methacrylate as a main component, can be suitably exemplified as the organic layer 24, because such a resin has low refractive index, high transparency, excellent optical characteristics, and the like.

Especially, an acrylic resin or a methacrylic resin can be suitably exemplified which contains, as a main component, a polymer of a monomer or an oligomer of acrylate and/or methacrylate having two or more functional groups, particularly, three or more functional groups, such as dipropylene glycol di(meth)acrylate (DPGDA), trimethylolpropane tri (meth)acrylate (TMPTA), or dipentaerythritol hexa(meth) acrylate (DPHA). Furthermore, it is preferable to use a plurality of acrylic resins or methacrylic resins described above.

The thickness of the organic layer 24 may be appropriately set according to the material for forming the organic layer 24 or the support 22. According to the examination performed by the inventors of the present invention, the thickness of the organic layer 24 is preferably 0.5 to 5 µm, and more preferably 1 to 3 µm.

In a case where the thickness of the organic layer 24 is equal to or greater than 0.5 µm, the surface of the organic layer 24, that is, the deposition surface for the inorganic layer 26 can be smoothed by concealing the surface asperities of the support 22 or the foreign substances having adhered to the surface of the support 22. In a case where the thickness of the organic layer 24 is equal to or smaller than 5 µm, it is possible to effectively inhibit the occurrence of problems such as cracking of the organic layer 24 caused in a case where the organic layer 24 is too thick and curling caused by the gas barrier layer 20.

In a case where the gas barrier film has a plurality of organic layers, such as a case where the gas barrier film has a plurality of combinations of an inorganic layer and an organic layer as a base, the organic layers may have the same thickness or different thicknesses.

The organic layer 24 may be formed by a known method such as a coating method or a flash vapor deposition method.

In order to improve the adhesiveness between the organic layer 24 and the inorganic layer 26 that becomes the underlayer of the organic layer 24, it is preferable that the organic layer 24 (composition that becomes the organic layer 24) contains a silane coupling agent.

In a case where the gas barrier film has a plurality of organic layers 24, such as a case where the gas barrier film has a plurality of combinations of an inorganic layer and an organic layer as a base including the organic layer 28 which will be described later, the organic layers may be formed of the same material or different materials. However, in view of productivity and the like, it is preferable that all the organic layers are formed of the same material.

On the organic layer 24, the inorganic layer 26 which is provided as the underlayer of the organic layer 24 is a film containing an inorganic compound as a main component and mainly exhibits gas barrier properties in the gas barrier layer 20.

As the inorganic layer 26, various films can be used which exhibit gas barrier properties and are formed of an inorganic compound such as an oxide, a nitride, or an oxynitride.

Specifically, films formed of inorganic compounds including 1) metal oxide such as aluminum oxide, magnesium oxide, tantalum oxide, zirconium oxide, titanium oxide, and indium tin oxide (ITO), 2) metal nitride such as aluminum nitride, 3) metal carbide such as aluminum carbide, 4) oxide of silicon such as silicon oxide, silicon oxynitride, silicon oxycarbide, and silicon oxynitrocarbide, 5) nitride of silicon such as silicon nitride and silicon nitrocarbide, 6) carbide of silicon such as silicon carbide, 7) hydroxides of 1) to 6), and 8) mixture of two or more kinds of 1) to 7) can be suitably exemplified.

Particularly, films formed of any of silicon compounds such as an oxide of silicon, a nitride of silicon, and an oxynitride of silicon, can be suitably exemplified, because these films have high transparency and can exhibit excellent gas barrier properties. Among these, a film formed of silicon nitride can be particularly suitably exemplified because this film exhibits better gas barrier properties and has high transparency.

The thickness of the inorganic layer 26 may be appropriately determined according to the material for forming the inorganic layer 26, such that intended gas barrier properties can be exhibited. According to the examination performed by the inventors of the present invention, the thickness of the inorganic layer 26 is preferably 10 to 200 nm, more preferably 10 to 100 nm, and particularly preferably 15 to 75 nm.

In a case where the thickness of the inorganic layer 26 is equal to or greater than 10 nm, an inorganic layer 26 stably demonstrating a sufficient gas barrier performance can be formed. Generally, in a case where the inorganic layer 26 is brittle and too thick, the inorganic layer 26 is likely to experience cracking, fissuring, peeling and the like. However, in a case where the thickness of the inorganic layer 26 is equal to or smaller than 200 nm, the occurrence of cracks can be prevented.

In a case where the gas barrier film has a plurality of inorganic layers 26, the inorganic layers 26 may have the same thickness or different thicknesses.

The inorganic layer 26 may be formed by a known method according to the material forming the inorganic layer 26. Specifically, plasma CVD such as capacitively coupled plasma (CCP)-chemical vapor deposition (CVD) or inductively coupled plasma (ICP)-CVD, sputtering such as magnetron sputtering or reactive sputtering, and a vapor-phase deposition method such as vacuum vapor deposition can be suitably exemplified.

In a case where the gas barrier film has a plurality of inorganic layers, the inorganic layers may be formed of the same material or different materials. However, in view of productivity and the like, it is preferable that all the inorganic layers are formed of the same material.

The organic layer 28 provided on the inorganic layer 26 is a layer functioning as a protective layer for the inorganic layer 26. In a case where the laminated film has the organic layer 28 as an uppermost layer, the damage of the inorganic layer 26 exhibiting gas barrier properties can be prevented, and hence the gas barrier layer 20 can stably exhibit intended gas barrier properties. Furthermore, in a case where the laminated film has the organic layer 28, it is also possible to improve the adhesiveness between the wavelength conversion layer 10, which is obtained by dispersing quantum dots and the like in a resin that becomes a matrix, and the gas barrier layer 20.

The organic layer 28 is basically the same as the aforementioned organic layer 24. In addition to this, as the organic layer 28, it is possible to suitably use an organic layer formed of a graft copolymer which contains an acryl polymer as a main chain and at least either an acryloyl group-terminated urethane polymer or an acryloyl group-terminated urethane oligomer as a side chain and has a molecular weight of 10,000 to 3,000,000 and has an acryl equivalent of equal to or greater than 500 g/mol.

The thickness of the gas barrier layer 20 may be appropriately set according to the thickness of the wavelength conversion laminated film 1, the size of the wavelength conversion laminated film 1, and the like.

According to the examination performed by the inventors of the present invention, the thickness of the gas barrier layer 20 is preferably 5 to 100 μm, more preferably 10 to 70 μm, and particularly preferably 15 to 55 μm.

In a case where the thickness of the gas barrier layer 20 is equal to or smaller than 100 μm, it is possible to prevent the gas barrier layer 20, that is, the laminated film 1 from becoming unnecessarily thick. Furthermore, it is preferable that the thickness of the gas barrier layer 20 is equal to or greater than 5 μm, because then the thickness of the wavelength conversion layer 10 can be made uniform at the time of forming the wavelength conversion layer 10 between two gas barrier layers 20.

In the example shown in the drawing, the laminate 5 has a constitution in which the wavelength conversion layer 10 is sandwiched between two sheets of gas barrier layers 20. In addition, layers for obtaining various functions such as a diffusion layer, an anti-Newton ring layer, a protective layer, and an adhesive layer may also be laminated.

[Method for Manufacturing Laminated Film]

Next, an example of a method for manufacturing the laminated film of the present invention will be described. Hereinafter, the method will be described mainly based on the laminated film 1 shown in FIG. 1 for example, but in other aspects, a laminated film can also be manufactured based on the method.

First, the laminate 5 including the wavelength conversion layer 10 is prepared.

As the preparation method of the laminate 5, first, the organic layer 24 is formed on the surface of the support 22 by a coating method or the like, and the inorganic layer 26 is formed on the surface of the organic layer 24 by plasma CVD or the like. Then, the organic layer 28 is formed on the surface of the inorganic layer 26 by a coating method or the like, thereby preparing the gas barrier layer 20 (gas barrier film).

It is preferable that the formation of the organic layer and the inorganic layer is performed by a so-called roll-to-roll method. In the following description, "roll-to-roll" will be referred to as "RtoR" as well.

Meanwhile, a composition is prepared which contains an organic solvent, a compound forming a resin to be a matrix, quantum dots and the like and becomes the wavelength conversion layer 10 such as a quantum dot layer.

Two sheets of gas barrier layers 20 are prepared, and the surface of the organic layer 28 of one of the gas barrier layers 20 is coated with the composition that becomes the wavelength conversion layer 10. Furthermore, the other sheet of the gas barrier layer 20 is laminated on the composition in a state where the organic layer 28 faces the composition side, and ultraviolet curing or the like is performed, thereby preparing a long laminate in which the gas barrier layer 20 laminated on both surfaces of the wavelength conversion layer 10.

The prepared long laminate is cut in a predetermined size, thereby preparing the laminate 5.

The method for cutting the laminate is not limited, and it is possible to use various known methods such as a method of physically cutting the laminate by using a blade such as a Thomson blade and a method of cutting the laminate by laser irradiation.

Furthermore, after the laminate is formed by being cut in a predetermined shape, for example, the end faces thereof may be subjected to polishing.

Then, on the end faces 5a of the prepared laminate 5, the aforementioned end face sealing layer 30 is formed.

First, the first metal layer 32 is formed on the end faces of the laminate 5. It is preferable that the first metal layer 32 is formed by deposition by means of a vapor-phase method such as sputtering or vapor deposition. The first metal layer 32 is sequentially formed on four end faces of the laminate 5 such that all the end faces are covered with the first metal layer 32.

Thereafter, the resin layer 34 is formed on the first metal layer 32. The resin layer 34 is formed by preparing a composition containing a compound that becomes the resin layer 34, coating the end faces of the laminate 5 with the composition, drying the composition, and, if necessary, polymerizing the compound mainly constituting the resin layer by ultraviolet irradiation, heating, and the like.

Figure 6:
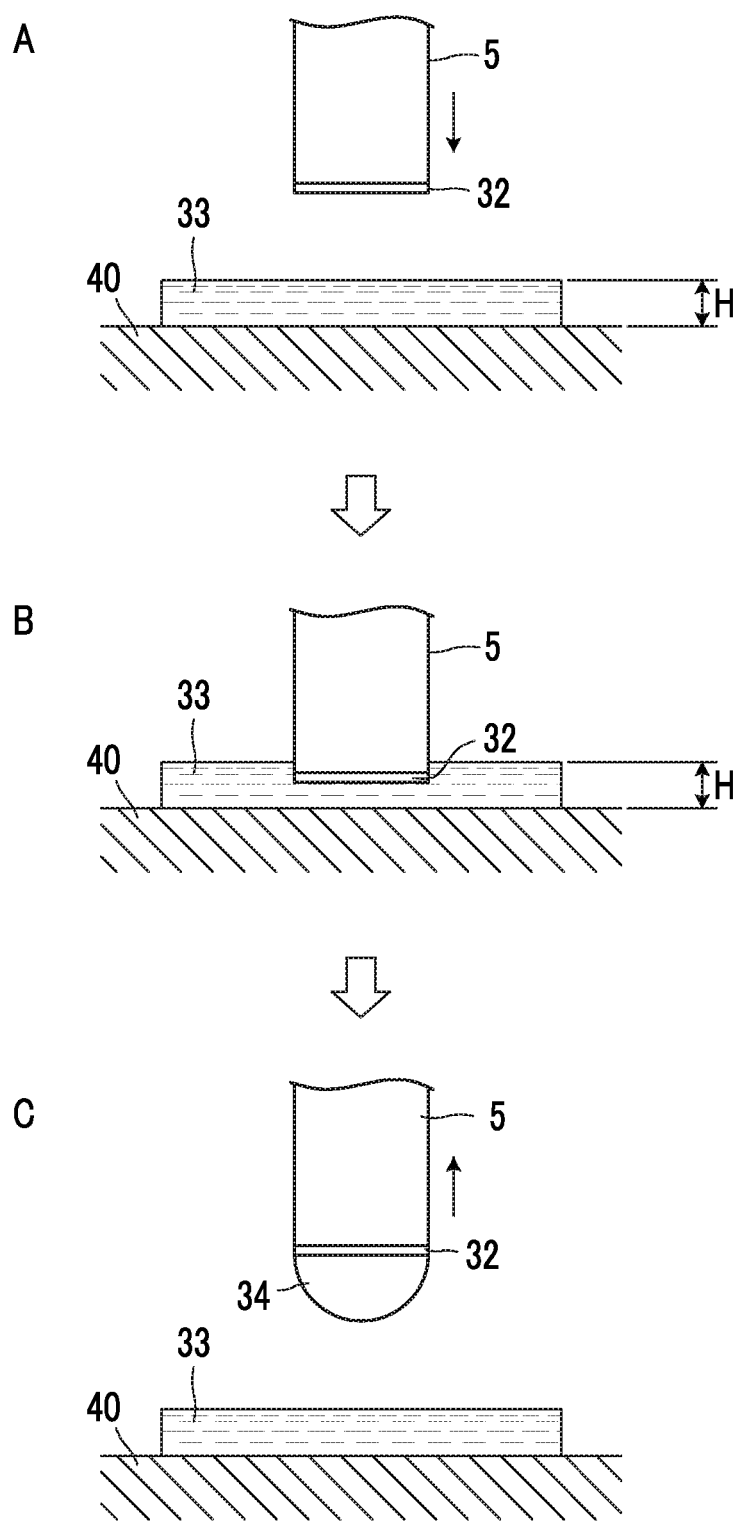
FIG. 6 is a schematic view for illustrating a method for manufacturing the wavelength conversion laminated film of the present invention.

As the method for coating the end faces of the laminate 5 with the composition, it is possible to use known methods such as ink jet, spray coating, and dipping (immersion coating). FIG. 6 shows a method of transferring a liquid film as a preferable coating method.

In this coating method, first, as shown in A of FIG. 6, a liquid film 33 of the composition that becomes the resin layer 34 is formed on a flat plate 40 (for example, a glass plate or a tray). A thickness H of the liquid film 33 may be appropriately set according to the intended thickness of the resin layer 34, the concentration of solid contents in the composition, and the like.

The size of the liquid film 33 in the surface direction is not particularly limited as long as the entirety of one end face of the laminate 5 can come into contact with the liquid film 33. For example, the length of one side of the liquid film 33 may be larger than the length of the edge side of the laminate 5.

Thereafter, as shown in B of FIG. 6, the first metal layer 32 formed on the end face 5a of the laminate 5 is brought into contact with the liquid film 33. Then, as shown in C of FIG. 6, the laminate 5 is lifted up in a vertical direction such that a predetermined amount of the composition that becomes the resin layer 34 adheres to the end face of the laminate 5 (specifically, the surface of the first metal layer 32 formed on the end face of the laminate 5).

At this time, the cross-sectional shape of the composition, which has adhered to the end face of the laminate 5, perpendicular to the extension direction of the end face becomes approximately circular due to the surface tension of the composition.

The amount of the end face to be immersed in the liquid film 33 may be appropriately set according to the thickness H of the liquid film 33 and the like.

After the composition is caused to adhere to the surface of the first metal layer 32 on all the end faces of the laminate 5 as described above, the composition is dried and, if necessary, cured by ultraviolet irradiation, heating, and the like, thereby forming the resin layer 34.

In the example shown in C of FIG. 6, a constitution is illustrated in which the end face of the laminate 5 is brought into contact with the liquid film 33, and then the laminate 5 is moved up in the vertical direction such that the liquid film 33 and the laminate 5 are separated from each other. However, the present invention is not limited thereto, and the liquid film 33 (flat plate 40) may be moved down in the vertical direction, or the laminate 5 and the liquid film 33 (flat plate 40) may be moved respectively.

In the example shown in B of FIG. 6, a constitution is illustrated in which the end face of the laminate 5 is moved down in the vertical direction such that the end face is brought into contact with the liquid film 33. However, the present invention is not limited thereto as long as the end face can be brought into contact with the liquid film 33.

The cross-sectional shape of the resin layer 34 becomes semicircular regardless of the magnitude of the absolute value of the surface energy (surface tension or contact angle) of the composition, as long as the composition is applied to the end face of the laminate 5.

In the examples shown in FIG. 6, a constitution is illustrated in which the end face of one sheet of laminate 5 is brought into contact with the liquid film 33. However, the present invention is not limited thereto, and a constitution may be adopted in which a plurality of sheets of laminates 5 are collectively brought into contact with the liquid film 33.

For example, laminates 5 and spacers may be alternately laminated such that the laminates 5 are separated from each other, and in this state, the end faces thereof may be brought into contact with the liquid film 33 of the composition forming the end face sealing layer 30 in the same manner as described above such that the end face sealing layer 30 is formed on the end faces of each of the laminates 5.

Figure 7A:
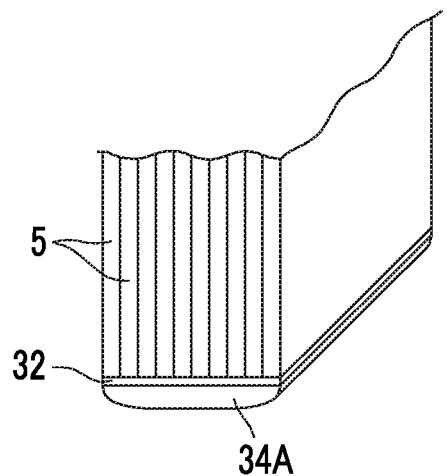
FIG. 7A is a schematic view illustrating another example of the method for manufacturing the wavelength conversion laminated film of the present invention.

Alternatively, as shown in FIG. 7A, a constitution may be adopted in which on the entirety of the end faces of a laminated material obtained by stacking a plurality of laminates 5 (for example, 1,000 sheets), a resin layer 34A is formed in the same manner as described above, and then the stacked laminates 5 may be separated by one by one, thereby forming the resin layer 34 on the end faces of each of the laminates 5.

Figure 7B:
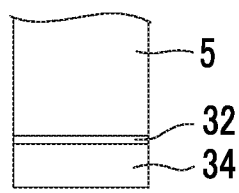
FIG. 7B is a schematic view of another example of a resin layer.

In a case where the resin layer 34 is formed in the aforementioned manner, the resin layer 34A formed on the end faces of the laminated material obtained by stacking the laminates 5 has a semiovale shape. Therefore, the resin layer 34 formed on the end faces of the laminate 5 laminated in the vicinity of the center of the laminated material has an approximately rectangular shape as shown in FIG. 7B.

In the examples shown in FIG. 6, a constitution is illustrated in which the liquid film 33 of the composition is formed on the flat plate 40, and the end face of the laminate 5 is brought into contact with the liquid film 33 such that the end face of the laminate 5 is coated with the composition that becomes the resin layer 34. However, the present invention is not limited thereto.

Figure 8:
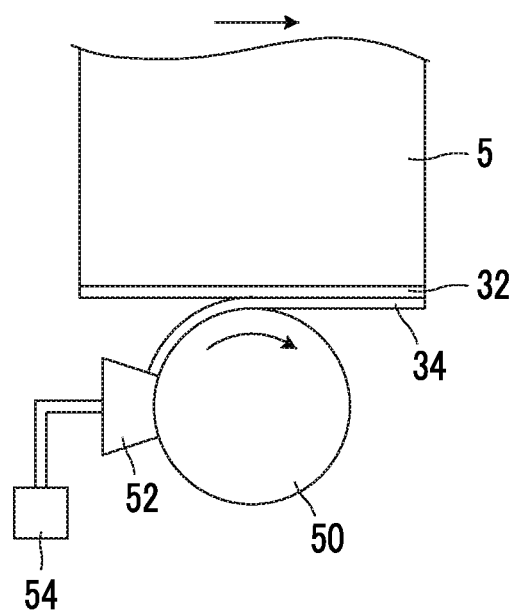
FIG. 8 is a schematic view illustrating still another example of the method for manufacturing the wavelength conversion laminated film of the present invention.

For example, a constitution shown in FIG. 8 may be adopted in which the coating film of the composition is formed on a rotating roller, and the end face of the laminate is brought into contact with the coating film on the roller such that the resin layer is formed.

The device shown in FIG. 8 has a tank 54 that stores the composition, a coating portion 52 that coats the peripheral surface of a roller 50 with the composition supplied from the tank 54, and the roller 50 that forms a coating film on the peripheral surface thereof. While the laminate 5 is being transported in a predetermined direction in synchronization with the rotating roller 50, the end face of the laminate 5 is brought into contact with the coating film on the roller 50 such that the composition adheres to the end face. Then, the composition is dried and, if necessary, cured by ultraviolet irradiation, heating, and the like, thereby forming the resin layer 34.

Then, the second metal layer 36 is formed on the resin layer 34.

As described above, as the method for forming the metal layer 36, it is possible to use an electroless plating treatment, an electroplating treatment, a sputtering method, a vacuum vapor deposition method, an ion plating method, a plasma CVD method, and the like.

As the method of the electroless plating treatment, the methods known in the related art can be used. For example, by immersing the end faces of the laminate 5, on which the resin layer 34 is formed, in an electroless plating liquid such that a metal film is precipitated on the resin layer 34, the metal layer 36 can be formed.

In this way, the laminated film 1 is prepared.

In a case where the resin layer 34 does not contain metal nanoparticles, an underlayer having conductivity may be provided on the resin layer 34, and the second metal layer 36 may be formed on the underlayer.

As described above, as the method for forming the underlayer, it is possible to use a sputtering method, a vacuum vapor deposition method, an ion plating method, a plasma CVD method, a coating method, and the like. As the method for coating the resin layer with the conductive paint, for example, a coating method by the transfer of a liquid film can be suitably used as in the case of the resin layer 34 described above. That is, in the laminate 5 in which the resin layer 34 is formed, by the same method as the method illustrated in FIG. 6 for example, the conductive paint that becomes the underlayer is caused to adhere onto the resin layer 34. Then, by drying and curing the conductive paint, the underlayer can be formed.

Hitherto, the laminated film of the present invention has been specifically described, but the present invention is not limited to the above embodiments. It goes without saying that the present invention may be ameliorated or modified in various ways within a scope that does not depart from the gist of the present invention.

EXAMPLES

Hereinafter, the present invention will be more specifically described based on specific examples of the present invention. The present invention is not limited to the examples described below, and the materials, the amount and proportion of the materials used, the treatment content, the treatment sequence, and the like shown in the following examples can be appropriately modified as long as the modification does not depart from the gist of the present invention.

Example 1

As Example 1, a wavelength conversion laminated film 1 shown in FIG. 1 was prepared.
<Preparation of gas barrier layer 20>
<<Support 22>>
As a support 22 of the gas barrier layer 20, a polyethylene terephthalate film (PET film, manufactured by Toyobo Co., Ltd, trade name: COSMOSHINE A4300, thickness: 50 μm, width: 1,000 mm, length: 100 m) was used.
<<Formation of Organic Layer 24>>
The organic layer 24 was formed on one surface of the support 22 as below.

First, a composition for forming the organic layer 24 was prepared. Specifically, trimethylolpropane triacrylate (TMPTA, manufactured by Daicel SciTech) and a photopolymerization initiator (manufactured by Lamberti S.p.A, ESACURE KT046) were prepared, weighed such that a mass ratio of TMPTA:photopolymerization initiator became 95:5, and dissolved in methyl ethyl ketone, thereby preparing a composition with a concentration of solid contents of 15%.

By using the composition, the organic layer 24 was formed on one surface of the support 22 by a general film forming device which forms a film by a coating method using RtoR.

First, by using a die coater, one surface of the support 22 was coated with the composition. The support 22 having undergone coating was passed through a drying zone with a temperature of 50° C. for 3 minutes and then irradiated with ultraviolet rays (cumulative irradiation amount: about 600 mJ/cm$^2$) such that the composition was cured, thereby forming the organic layer 24.

Furthermore, in the pass roll obtained immediately after the ultraviolet ray curing, as a protective film, a polyethylene film (PE film, manufactured by Sun A Kaken Co., Ltd., trade name: PAC 2-30-T) was bonded to the surface of the organic layer 24, and the resulting film was transported and wound up.

The thickness of the formed organic layer 24 was 1 μm.
<<Formation of Inorganic Layer 26>>
Then, by using a CVD device using RtoR, the inorganic layer 26 (silicon nitride (SiN) layer) was formed on the surface of the organic layer 24.

The support 22 on which the organic layer 24 was formed was fed from a feeding machine, and before an inorganic layer was formed, the protective film was peeled off after the laminate passed the last film surface-touching roll. Then, on the exposed organic layer 24, the inorganic layer 26 was formed by plasma CVD.

For forming the inorganic layer 26, as raw material gases, silane gas (flow rate: 300 sccm), ammonia gas (flow rate: 370 sccm), hydrogen gas (flow rate: 590 sccm), and nitrogen gas (flow rate: 240 sccm) were used. As a power source, a high-frequency power source having a frequency of 13.56 MHz was used. The film forming pressure was 40 Pa.

The thickness of the formed inorganic layer 26 was 50 nm.

The flow rate represented by the unit sccm is a value expressed in terms of a flow rate (cc/min) at 1,013 hPa and 0° C.
<<Formation of Organic Layer 28>>
Furthermore, the organic layer 28 was laminated on the surface of the inorganic layer 26 as below.

First, a composition for forming the organic layer 28 was prepared. Specifically, a urethane bond-containing acryl polymer (manufactured by TAISEI FINE CHEMICAL CO., LTD., ACRIT 8BR500, mass-average molecular weight: 250,000) and a photopolymerization initiator (IRGACURE 184 manufactured by BASF SE) were prepared, weighed such that a mass ratio of urethane bond-containing acryl polymer:photopolymerization initiator became 95:5, and dissolved in methyl ethyl ketone, thereby preparing a composition with a concentration of solid contents of 15% by mass.

By using the composition, the organic layer 28 was formed on the surface of the inorganic layer 26 by using a general film forming device that forms a film by a coating method using RtoR.

First, by using a die coater, the inorganic layer 26 was coated with the composition. The support 22 having undergone coating was passed through a drying zone with a temperature of 100° C. for 3 minutes, thereby forming the organic layer 28.

In this way, the gas barrier layer 20 shown in FIG. 2 was prepared in which the organic layer 24, the inorganic layer 26, and the organic layer 28 were formed on the support 22. The thickness of the formed organic layer 24 was 1 μm.

In the pass roll obtained immediately after drying of the composition, as a protective film, a polyethylene film was bonded to the surface of the organic layer 28 in the same manner as described above, and then the gas barrier layer 20 was wound up.
<Preparation of Laminate 5>
A composition having the following makeup was prepared which was for forming a quantum dot layer as the wavelength conversion layer 10.

(Makeup of Composition)

| | |
|---|---|
| Toluene dispersion liquid of quantum dot 1 (emission maximum: 520 nm) | 10 parts by mass |
| Toluene dispersion liquid of quantum dot 2 (emission maximum: 630 nm) | 1 part by mass |
| Lauryl methacrylate | 2.4 parts by mass |
| Trimethylolpropane triacrylate | 0.54 parts by mass |
| Photopolymerization initiator (IRGACURE 819 (manufactured by BASF SE) | 0.009 parts by mass |

As the quantum dots 1 and 2, the following nanocrystals having a core-shell structure (InP/ZnS) were used.

Quantum dot 1: INP 530-10 (manufactured by NN-LABS, LLC)

Quantum dot 2: INP 620-10 (manufactured by NN-LABS, LLC)

The viscosity of the prepared composition was 50 mPa·s.

By using the composition and a general film forming device that forms a film by a coating method using RtoR, a laminate was prepared in which the gas barrier layer 20 was laminated on both surfaces of the wavelength conversion layer 10.

Two sheets of gas barrier layers 20 were loaded on the film forming device in a predetermined position and transported. First, the protective film of one of the gas barrier layers was peeled, and then the surface of the organic layer 28 was coated with the composition by using a die coater. Thereafter, the protective film was peeled from the other gas barrier layer 20, and then the gas barrier layers 20 was laminated in a state where the organic layer 28 faced the composition.

Furthermore, the laminate in which the composition that becomes the wavelength conversion layer 10 was sandwiched between the gas barrier layers 20 was irradiated with ultraviolet rays (cumulative irradiation amount: about 2,000 $mJ/cm^2$), such that the composition was cured, and the wavelength conversion layer 10 was formed. In this way, a laminate was prepared in which the gas barrier layer 20 was laminated on both surfaces of the wavelength conversion layer 10.

The thickness of the wavelength conversion layer 10 was 46 μm, and the thickness T of the laminate was 150 μm.

By using a Thomson blade with a blade edge angle of 17°, the prepared laminate was cut in the form of a sheet with A4 size, thereby obtaining the laminate 5.

<Formation of End Face Sealing Layer 30>

Then, on the end faces of the prepared laminate 5, the end face sealing layer 30 constituted with three layers including the first metal layer 32, the resin layer 34, and the second metal layer 36 was formed.

<<Formation of First Metal Layer 32>>

1,000 sheets of laminates 5 with cut end faces were stacked, and by using a general sputtering device, a titanium layer was formed on lateral surfaces of the laminated material formed of the plurality of sheets of the stacked laminates 5. Titanium was used as a target, and argon was used as a discharge gas. The film forming pressure was 0.5 Pa, the film forming power was 400 W, and the final film thickness was 10 nm. Then, by changing titanium into copper as a target and setting the film forming pressure and the film forming power to be the same as described above, a copper layer having a film thickness of 75 nm was formed on the titanium layer.

In this way, in the present example, as the first metal layer 32, a sputtering film having a double layer structure, which was obtained by laminating a copper layer having a film thickness of 75 nm on a titanium layer having a film thickness of 10 nm, was formed.

<<Formation of Resin Layer 34>>

Then, the resin layer 34 was formed on the entire surface of the metal layer 32.

As a paint for forming the resin layer 34, METALLOID ML-400 (plating primer containing Pd nanoparticles: manufactured by IOX) was used.

The end faces of the metal layer 32 were brought into contact with the surface of METALLOID ML-400 and then lifted up in the vertical direction, such that a predetermined amount of the plating primer adhered onto the metal layer 32. Thereafter, the plating primer was dried and cured for 10 minutes at 80° C., thereby forming the resin layer 34.

The thickness of the resin layer 34 was 0.2 μm. The oxygen permeability of the resin layer 34 of the present example formed using METALLOID ML-400 was higher than 50 cc/$m^2$ day·atm.

<<Formation of Second Metal Layer 36>>

Subsequently, the end faces (resin layer 34) of the laminate 5 was immersed in an electroless copper plating bath, which will be described below, such that an electroless copper plating layer was formed as the metal layer 36 on the entire surface of the resin layer 34, thereby preparing the laminated film 1.

As the electroless copper plating bath, THRU-CUP PSY (initial Cu concentration: 2.5 g/L, bath volume: 1,000 mL, 33° C., 15 minutes) manufactured by Uyemura CO., LTD was used.

The thickness of the second metal layer 36 was 0.5 μm.

Example 2

A laminate 5 was obtained in the same manner as in Example 1.

<Formation of End Face Sealing Layer 30>

Then, on the end faces of the prepared laminate 5, the end face sealing layer 30 including three layers of the first metal layer 32, the resin layer 34, and the second metal layer 36 was formed.

<<Formation of First Metal Layer 32>>

By the same method as that used in Example 1, as the first metal layer 32, a sputtering film having a double layer structure, which was obtained by laminating a copper layer having a film thickness of 75 nm on a titanium layer having a film thickness of 10 nm, was formed.

<<Formation of Resin Layer 34>>

As a composition forming the resin layer 34, a composition composed of the following solid contents was prepared.

| | |
|---|---|
| Main agent of two liquid-type thermosetting epoxy resin (manufactured by MITSUBISHI GAS CHEMICAL COMPANY, INC., M-100) | 32 parts by mass |
| Curing agent of two liquid-type thermosetting epoxy resin (manufactured by MITSUBISHI GAS CHEMICAL COMPANY, INC., C-93) | 68 parts by mass |
| 1-Butanol | 60 parts by mass |

The flat plate 40 was coated with the prepared composition, thereby forming the liquid film 33 having a thickness H of 200 μm. Then, as shown in FIG. 6, the end face of the laminate 5 was brought into contact with the liquid film 33 and then lifted up in a vertical direction, such that a predetermined amount of composition adhered to the end face. Thereafter, by drying and curing the composition for 10 minutes at 80° C., the resin layer 34 was formed. The thickness of the resin layer 34 was 4 μm.

Furthermore, on a biaxially oriented polyester film (manufactured by TORAY INDUSTRIES, INC., LUMIRROR T60), a sample for measuring oxygen permeability having a thickness of 40 μm was prepared exactly in the same manner as used for preparing the resin layer 34 described above. Then, the sample for measuring oxygen permeability was peeled from the polyester film, and by using a measurement instrument (manufactured by NIPPON API CO., LTD.) adopting an APIMS method (atmospheric pressure ionization mass spectrometry), the oxygen permeability was measured under the condition of a temperature of 25° C. and a humidity of 60% RH.

As a result, the oxygen permeability of the sample for measuring oxygen permeability, that is, the oxygen permeability of the end face sealing layer 30 was 10 cc/(m²·day·atm).

<<Formation of Second Metal Layer 36>>

In the present example, as the second metal layer 36, by the same sputtering method as that used for forming the first metal layer 32, a sputtering film having a double layer structure, which was obtained by laminating a copper layer having a film thickness of 75 nm on a titanium layer having a film thickness of 10 nm, was formed.

Comparative Example 1

A laminated film was prepared in the same manner as in Example 1, except that the end face sealing layer was not formed.

Comparative Example 2

In the same manner as in Example 1, the laminate 5 was obtained. Then, by the method for forming the first metal layer 32 used in Example 1, a sputtering film having a double layer structure including a titanium layer having a film thickness of 10 nm and a copper layer having a film thickness of 75 nm was provided on the end faces of the laminate, thereby obtaining a laminated film of Comparative Example 2. That is, the laminated film of Comparative Example 2 is a structure including an end face sealing layer having only a metal sputtering film.

[Evaluation]

The laminated films of Examples 1 and 2 and Comparative Examples 1 and 2 prepared as above were evaluated in terms of the performance deterioration (barrier properties) of the edge.

<Barrier Properties>

By measuring the degree of performance deterioration of the edge, the barrier properties of the end face sealing layer were evaluated.

First, an initial luminance (Y0) of the laminated film was measured in the following sequence. A commercially available tablet terminal (Kindle (registered trademark) "Fire HDX 7" manufactured by Amazon.com, Inc) was disassembled, and the backlight unit was taken out. The laminated film was disposed on the light guide plate of the backlight unit taken out, and two prism sheets of directions orthogonal to each other were stacked on the laminated film. The luminance of light, which was emitted from a blue light source and transmitted through the laminated film and two prism sheets, was measured using a luminance meter (SR3, manufactured by TOPCON CORPORATION) installed in a position 740 mm distant from light guide plate in a direction perpendicular to the surface of the light guide plate, and taken as the luminance of the laminated film. The luminance was measured approximately at the center of the surface of the sample.

Then, the laminated film was put into a constant-temperature tank kept at 60° C. and a relative humidity of 90% and stored as it was for a predetermined period of time. The laminated film was taken out at the timing after 500 hours and 1,000 hours respectively, and a luminance (Y1) after the high-temperature high-humidity testing was measured in the same sequence as described above. By using the following equation, a rate of change ($\Delta Y$) of the luminance (Y1) after the high-temperature high-humidity testing with respect to the initial luminance (Y0) was calculated. By using $\Delta Y$ as a parameter of a luminance change, the barrier properties were evaluated based on the following standards.

$$\Delta Y[\%] = (Y0-Y1)/Y0 \times 100$$

A: $\Delta Y \leq 5\%$
B: $5\% < \Delta Y < 15\%$
C: $15\% \leq \Delta Y$

The results are shown in Table 1.

TABLE 1

| | First metal layer Thickness | Resin layer | | | Second metal layer Thickness | Performance deterioration | |
|---|---|---|---|---|---|---|---|
| | | Thickness of resin layer | | Oxygen permeability | | | |
| | [μm] | [μm] | Material | [cc/(m² · day · atm)] | [μm] | 500 h | 1000 h |
| Example 1 | 0.085 | 0.2 | ML-400 | 50< | 0.5 | A | B |
| Example 2 | 0.085 | 4 | MAXIVE | 10 | 0.085 | A | A |
| Comparative Example 1 | — | — | — | — | — | C | — |
| Comparative Example 2 | 0.085 | — | — | — | — | C | — |

As shown in Table 1, it is understood that the temporal change of gas barrier properties is further reduced in the laminated film of the present invention than in comparative examples, and the deterioration of quantum dots (wavelength conversion layer) can be prevented in the laminated film because oxygen and water can be blocked by the end face sealing layer.

EXPLANATION OF REFERENCES

1, 2, 3: wavelength conversion laminated film
5: laminate
5a: end face of laminate
10: wavelength conversion layer
11: phosphor
12: matrix 20: gas barrier layer
22: support
24, 28: organic layer
26: inorganic layer
30, 30A, 30B: end face sealing layer
32: first metal layer
33: liquid film
34, 34A: resin layer
34b: end face of resin layer
36: second metal layer
40: flat plate
50: roller
52: coating portion
54: tank

What is claimed is:

1. A wavelength conversion laminated film comprising:
a laminate which has a wavelength conversion layer containing a phosphor and a gas barrier layer laminated on both the main surfaces of the wavelength conversion layer; and
an end face sealing layer which covers at least end faces of the wavelength conversion layer among end faces of the laminate,
wherein the end face sealing layer includes, from the side of the end faces of the laminate, a first metal layer coming into contact directly with the end faces of the laminate, a resin layer, and a second metal layer in this order.

2. The wavelength conversion laminated film according to claim 1,
wherein the second metal layer is formed to cover an outer surface of the resin layer.

3. The wavelength conversion laminated film according to claim 1,
wherein the resin layer is covered with the first metal layer and the second metal layer.

4. The wavelength conversion laminated film according to claim 1,
wherein the end face sealing layer covers the end faces of the laminate.

5. The wavelength conversion laminated film according to claim 2,
wherein the end face sealing layer covers the end faces of the laminate.

6. The wavelength conversion laminated film according to claim 3,
wherein the end face sealing layer covers the end faces of the laminate.

7. The wavelength conversion laminated film according to claim 1,
wherein a thickness of the first metal layer is 0.01 μm to 1 μm.

8. The wavelength conversion laminated film according to claim 1,
wherein the first metal layer is a layer formed by vapor-phase deposition.

9. The wavelength conversion laminated film according to claim 1,
wherein an oxygen permeability of the resin layer is equal to or lower than 50 cc/(m$^2$·day·atm).

10. The wavelength conversion laminated film according to claim 1,
wherein the resin layer contains metal nanoparticles, and the second metal layer is an electroless plating layer.

11. The wavelength conversion laminated film according to claim 1,
wherein the phosphor is quantum dot.

* * * * *